United States Patent
Oe et al.

(10) Patent No.: US 11,303,376 B2
(45) Date of Patent: Apr. 12, 2022

(54) INFORMATION PROCESSING APPARATUS AND TIME SYNCHRONIZATION METHOD

(71) Applicant: FUJITSU LIMITED, Kawasaki (JP)

(72) Inventors: Shiryu Oe, Fukuoka (JP); Tsutomu Noguchi, Fukuoka (JP); Haruhisa Fukano, Munakata (JP); Akihiro Kuwabara, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 16/876,220

(22) Filed: May 18, 2020

(65) Prior Publication Data
US 2020/0382233 A1  Dec. 3, 2020

(30) Foreign Application Priority Data
May 28, 2019 (JP) .............................. JP2019-099444

(51) Int. Cl.
*H04J 3/06* (2006.01)

(52) U.S. Cl.
CPC .......... *H04J 3/0682* (2013.01); *H04J 3/0644* (2013.01); *H04J 3/0667* (2013.01)

(58) Field of Classification Search
CPC ...... H04J 3/0644; H04J 3/0667; H04J 3/0682; H04L 7/0016; H04L 7/0033; H04W 56/001
See application file for complete search history.

(56) References Cited

U.S. PATENT DOCUMENTS

| | | | | |
|---|---|---|---|---|
| 5,276,659 A | * | 1/1994 | Kotaki | G06F 1/14 368/10 |
| 8,532,241 B2 | * | 9/2013 | Lee | H03L 7/093 375/356 |
| 8,817,823 B2 | * | 8/2014 | Shen | H04J 14/0201 370/503 |
| 9,264,213 B2 | * | 2/2016 | Kozaki | H04B 10/032 |
| 9,344,982 B2 | * | 5/2016 | Yang | H04W 56/0015 |
| 2009/0086764 A1 | * | 4/2009 | Lee | H04L 69/28 370/503 |
| 2010/0040090 A1 | * | 2/2010 | Lee | H04J 3/0673 370/503 |
| 2015/0142382 A1 | * | 5/2015 | Osagawa | G04R 20/00 702/176 |

FOREIGN PATENT DOCUMENTS

JP  2012-023654 A  2/2012

* cited by examiner

*Primary Examiner* — Alpus Hsu
(74) *Attorney, Agent, or Firm* — Fujitsu Patent Center

(57) ABSTRACT

A non-transitory computer-readable recording medium storing a program that causes a computer to execute a time synchronization process between a master device and a slave device, the process includes calculating a clock deviation between the master device and the slave device based on a plurality of pieces of time information in each of the master device and the slave device, dividing a difference in the clock deviation, and incorporating each of the divided differences into the time information of the slave device to correct the clock deviation.

16 Claims, 31 Drawing Sheets

INFORMATION PROCESSING APPARATUS AND TIME SYNCHRONIZATION METHOD

CROSS-REFERENCE TO RELATED APPLICATION

This application is based upon and claims the benefit of priority of the prior Japanese Patent Application No. 2019-99444, filed on May 28, 2019, the entire contents of which are incorporated herein by reference.

FIELD

The embodiments discussed herein are related to a recording an information processing apparatus and a time synchronization method.

BACKGROUND

In recent years, devices in various fields coupled to a network have being performing data stream synchronization. Time synchronization using a Precision Time Protocol (PTP) control method is performed to synchronize time information of devices, and the time information of each slave device is adjusted to the time information transmitted from a grand master. In the fields requested to have high reliability such as broadcasting, communications, railways, finance, electric power, and the Internet of Things (IoT), for example, devices perform time synchronization therebetween with high accuracy in the order of one millionth seconds.

The PTP-based time synchronization is performed between one or more master devices each serving as a time standard and one or more slave devices.

The master device and the slave device exchanges four types of PTP massages named sync, FollowUp, Delay_Req, and Delay_Resp in each of which the time information of the sender device is embedded as a time stamp. A transmission path delay between the master device and the slave device is calculated from these messages, and the time is corrected.

Sync is a message for a delay measurement which the master device transmits on a regular basis. FollowUp contains a time point at which the sync message was transmitted to a network line, and is transferred from the master device to the slave device. Delay_Req is a message for a delay measurement which the slave device transmits to the master device on an irregular basis (at random intervals). Delay_Resp contains a time point at which the Delay_Req message was received from the network line, and is transferred from the master device to the slave device.

The master device transmits sync to the slave device at a time point T1, and the slave device obtains a time point T2 at which the sync is received. The time point T1 at which a physical layer (PHY) of the master device outputs the sync is included in the next FollowUP, which is then transmitted from the master device to the slave device, and the slave device obtains the transmission time point T1 of the sync. A delay due to communication from the master device to the slave device is calculated based on a difference between the time point T2 and the time point T1. The slave device obtains a transmission time point T3 and a reception time point T4 of Delay_Req from the Delay_Req transmitted from the slave device and the Delay_Resp transmitted from the master device, and calculates a delay due to communication from the slave device to the master device.

The time difference Δ1 from the master device to the slave device is expressed by the following formula (1) and the time difference Δ2 from the slave device to the master device is expressed by the following formula (2).

$$\Delta 1 = T2 - T1 = \text{delay} + \text{offset} \quad (1)$$

$$\Delta 2 = T4 - T3 = \text{delay} - \text{offset} \quad (2)$$

A transmission path delay between the master device and the slave device is expressed by the following formula (3) based on the formulae (1) and (2).

$$\text{delay} = (\Delta 1 + \Delta 2)/2 \quad (3)$$

A time offset between the master device and the slave device is expressed by the following formula (4) based on the formula (1).

$$\text{offset} = \Delta 1 - \text{delay} \quad (4)$$

The time of the slave device is corrected by the calculated offset to synchronize the times of the master device and the slave device.

A related technique is disclosed in, for example, Japanese Laid-open Patent Publication No. 2012-23654.

SUMMARY

According to an aspect of the embodiments, a non-transitory computer-readable recording medium storing a program that causes a computer to execute a time synchronization process between a master device and a slave device, the process includes calculating a clock deviation between the master device and the slave device based on a plurality of pieces of time information in each of the master device and the slave device, dividing a difference in the clock deviation, and incorporating each of the divided differences into the time information of the slave device to correct the clock deviation.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
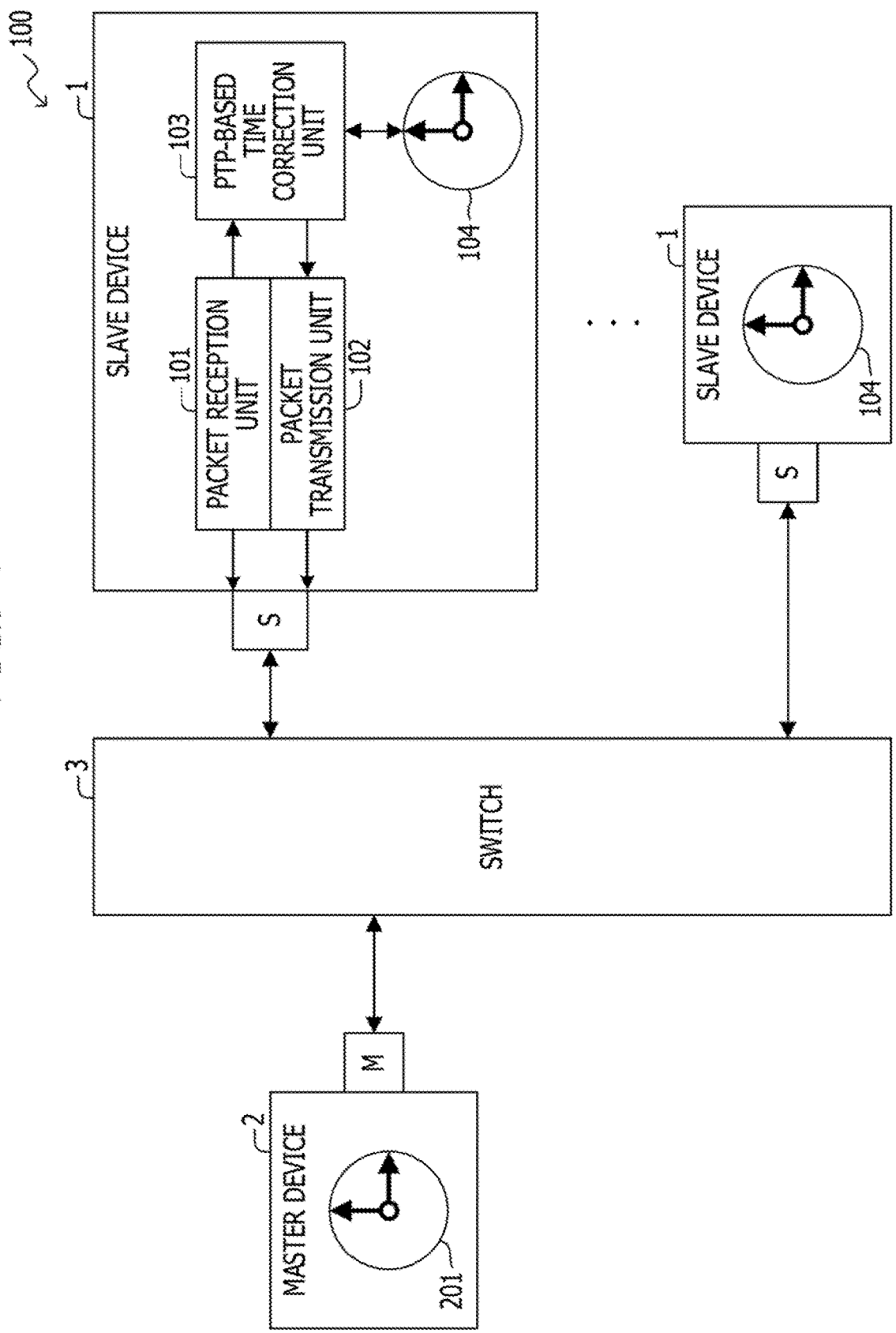
FIG. 1 is a block diagram schematically illustrating a configuration example of an information processing system in an example of the embodiment.

Oscillators provided to the master devices and the slave devices have different clock deviations. For this reason, a time offset occurs between the devices.

Hereinafter, with reference to the drawings, description is given of an embodiment of a technique capable of performing highly accurate time synchronization between devices. The embodiment discusses herein is only an example, and is not intended to exclude various modifications and applications of the technique, which are not explicitly described in the embodiment. For example, the present embodiment may be implemented with various modifications without departing from the gist of the embodiment.

The drawings are not intended to specify that only constituent elements illustrated therein are included, but other functions and so forth may be included.

In the drawings, the same reference signs indicate the same or similar constituent elements, and therefore duplicate description thereof is omitted below.

[A] Example of Embodiment

[A-1] System Configuration Example

FIG. 1 is a block diagram schematically illustrating a configuration example of an information processing system 100 in an example of the embodiment.

The information processing system 100 includes multiple slave devices 1, a master device 2, and a switch 3.

The switch 3 relays communications between the master device 2 and the slave devices 1.

The master device 2 is an example of a high-level device, includes a time management unit 201, and transmits packets in conformity with the PTP standard.

Each slave device 1 is an example of an information processing apparatus, is equipped with a general-purpose Peripheral Component Interconnect Express (PCIe) card having a clock deviation of, for example, ±100 ppm, and performs a time correction process based on packets received from the master device 2. The time synchronization may be performed such that a time difference between the multiple slave devices 1 may be equal to or smaller than ±1 μs. The slave device 1 includes a packet reception unit 101, a packet transmission unit 102, a PTP-based time correction unit 103, and a time management unit 104.

The packet reception unit 101 receives packets transmitted from the master device 2. The packet transmission unit 102 transmits packets to the master device 2. The PTP-based time correction unit 103 corrects a time managed by the time management unit 104 based on packets received by the packet reception unit 101.

Figure 2:
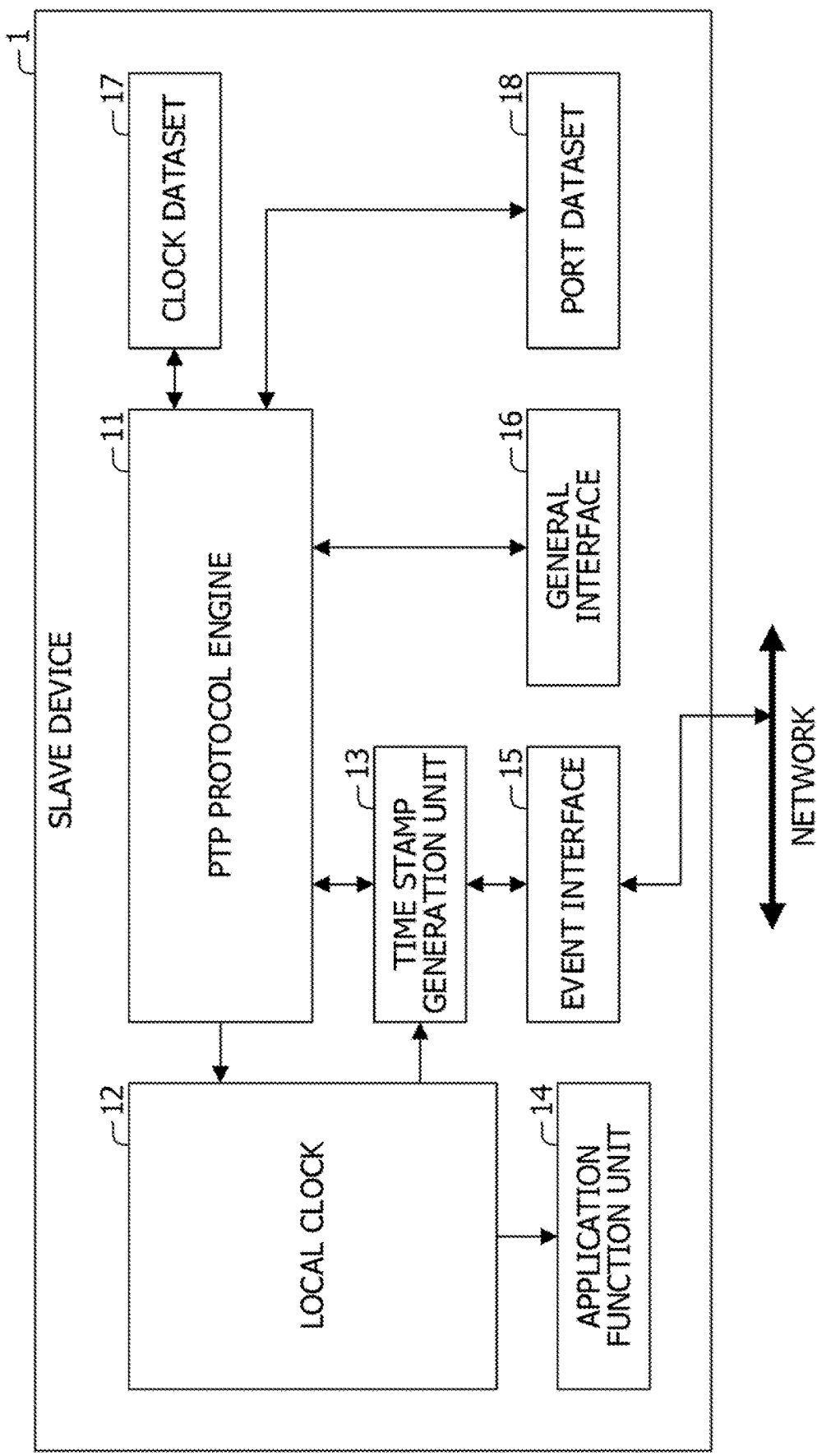
FIG. 2 is a block diagram schematically illustrating a hardware configuration example of a slave device illustrated in FIG. 1.

FIG. 2 is a block diagram schematically illustrating a hardware configuration example of the slave device 1 illustrated in FIG. 1.

The slave device 1 includes a PTP protocol engine 11, a local clock 12, a time stamp generation unit 13, an application function unit 14, an event interface 15, a general interface 16, a clock dataset 17, and a port dataset 18.

The PTP protocol engine 11 corrects the time in the slave device 1 in accordance with PTP as described later with reference to FIG. 3.

The local clock 12 manages the time in the slave device 1.

The time stamp generation unit 13 obtains a current time from the local clock 12 and generates a time stamp.

The application function unit 14 includes a sensor and an actuator and provides various functions.

The event interface 15 is coupled to a network, and transmits and receives packets concerning an event such as the occurrence of a time offset between the slave device 1 and the master device 2.

The general interface 16 is coupled to the network, and transmits and receives packets to be used by the application function unit 14.

The clock dataset 17 is a memory which holds various kinds of data concerning the clock.

The port dataset 18 is a memory which holds information concerning every port to which the slave device 1 is coupled.

Figure 3:
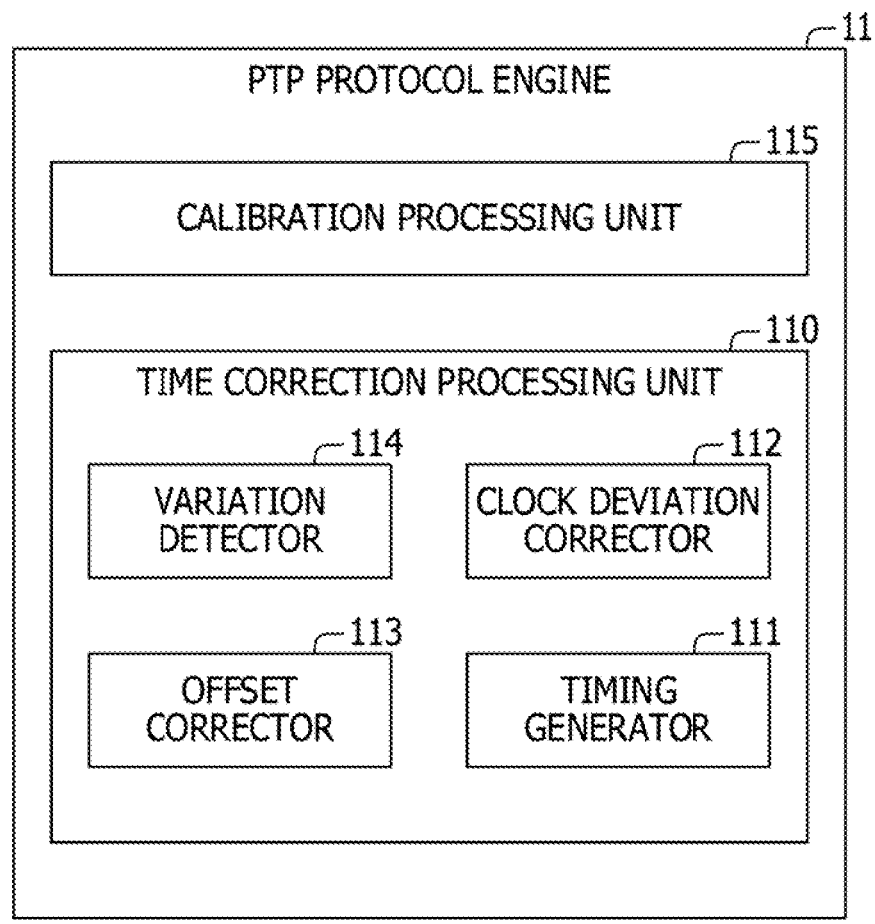
FIG. 3 is a block diagram schematically illustrating a functional configuration example of a PTP protocol engine illustrated in FIG. 2.

FIG. 3 is a block diagram schematically illustrating a functional configuration example of the PTP protocol engine 11 illustrated in FIG. 2.

The PTP protocol engine 11 functions as a time correction processing unit 110 and a calibration processing unit 115. The time correction processing unit 110 has functions as a timing generator 111, a clock deviation corrector 112, an offset corrector 113, and a variation detector 114, and may implement these functions by using a processor.

The calibration processing unit 115 calculates a clock deviation and a transmission path delay between the master device 2 and the slave device 1.

For instance, the calibration processing unit 115 functions as an example of a pre-processing unit that calculates the clock deviation between the master device 2 and the slave device 1 based on multiple pieces of time information in each of the master device 2 and the slave device 1. The calibration process is a process at a stage prior to the start of the time synchronization process (namely, a routine process) between the master device 2 and the slave device 1.

The calibration processing unit 115 may calculate the transmission path delay between the master device 2 and the slave device 1 prior to the start of the time synchronization process. When a variation in the calculated clock deviation or transmission path delay is detected in the time synchronization process, the calibration processing unit 115 may again calculate at least one of the clock deviation and the transmission path delay.

At a moment when m clocks (m is a natural number) elapse, the timing generator 111 outputs a timing pulse to generate a correction timing for the clock deviation corrector 112.

The clock deviation corrector 112 corrects the clock deviation based on the clock deviation calculated by the calibration processing unit 115 in response to the timing generated by the timing generator 111.

For instance, the clock deviation corrector 112 corrects the clock deviation in the time synchronization process by dividing a difference between the clock deviations and reflecting each of the divided differences into the time information in the slave device 1.

The offset corrector 113 receives sync from the master device 2 and calculates an offset value. The offset corrector 113 dividedly corrects the calculated offset to reduce a time difference between the slave devices 1.

For instance, in the time synchronization process, the offset corrector 113 functions as an example of a time difference correction unit that dividedly corrects a time offset between the master device 2 and the slave device 1.

The variation detector 114 detects a variation in the transmission path delay or the clock deviation, and notifies the calibration processing unit 115 of the detection result.

Figure 4:
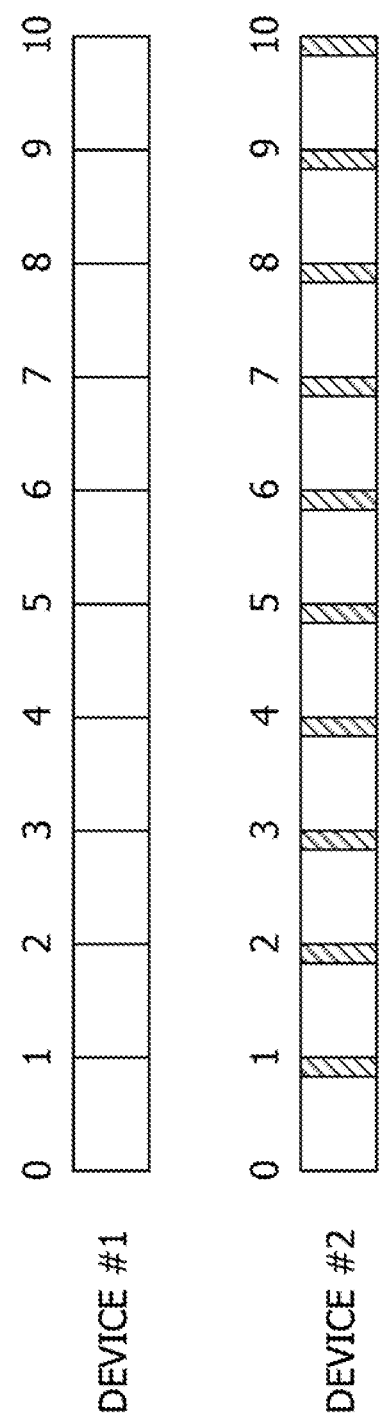
FIG. 4 is a diagram for explaining time offset correction by the slave device in the information processing system illustrated in FIG. 1.
Figure 5:
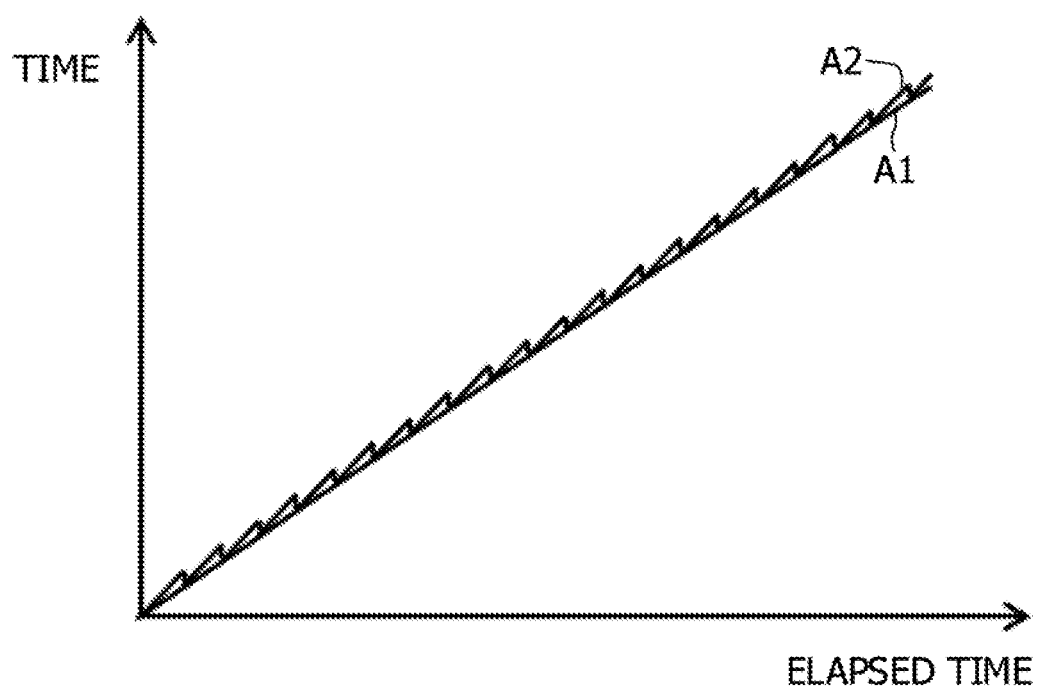
FIG. 5 is a graph for explaining the time offset correction by the slave device in the information processing system illustrated in FIG. 1.

FIG. 4 is a diagram for explaining time offset correction by the slave device 1 in the information processing system 100 illustrated in FIG. 1. FIG. 5 is a graph for explaining the time offset correction by the slave device 1 in the information processing system 100 illustrated in FIG. 1.

The slave device 1 measures a difference in a clock deviation between the master device 2 and the slave device 1 itself. The slave device 1 finely divides this difference to correct the time information, so that a difference in time increment amount between the master device 2 and the slave device 1 is minimized. This makes the time in the slave device 1 pass in line with the time in the master device 2 as illustrated in FIGS. 4 and 5 and thereby enables highly accurate time synchronization as in the case where a highly accurate oscillator is used.

In the example illustrated in FIG. 4, time offsets of a device #2 with respect to a device "1 (see hatched parts) are corrected at respective timings "1" to "10".

In the example illustrated in FIG. 5, reference sign A1 indicates a relation between an elapsed time and a time in the device #1, and reference sign A2 indicates a relation between an elapsed time and a time in the device #2. In the device #2, the time correction is executed at every short elapsed time.

Figure 6:
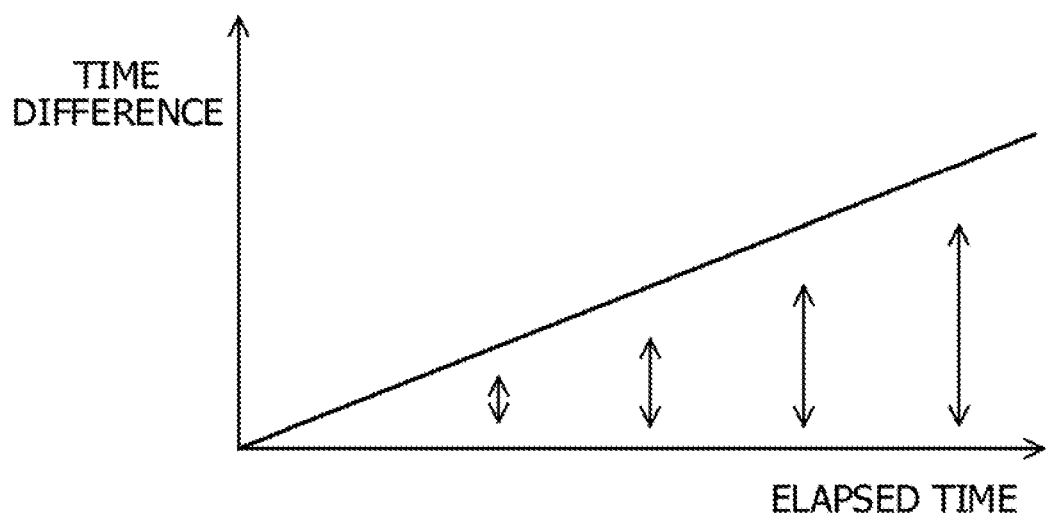
FIG. 6 is a graph for explaining a difference due to a clock deviation in the information processing system illustrated in FIG. 1.
Figure 7:
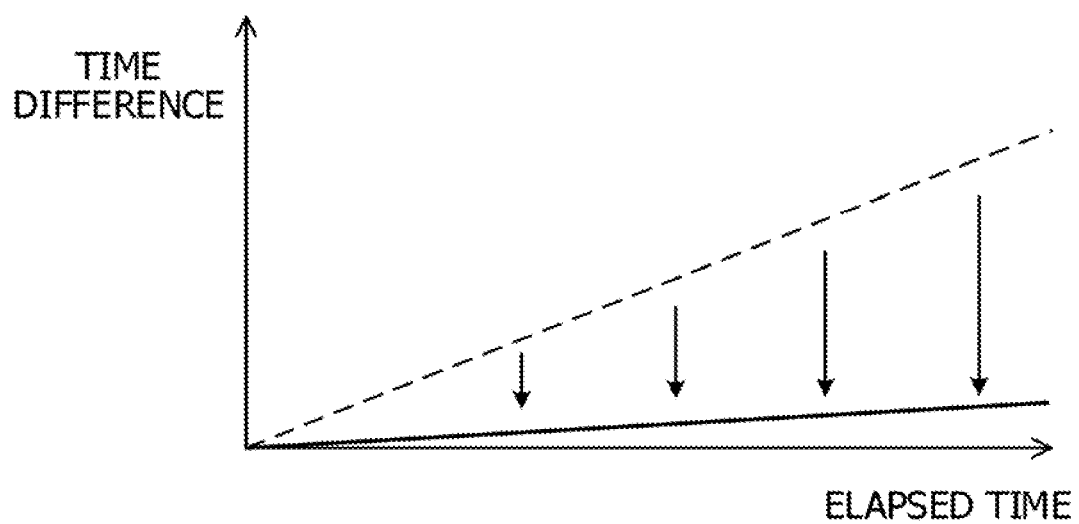
FIG. 7 is a graph for explaining correction of the difference due to the clock deviation in the information processing system illustrated in FIG. 1.

FIG. 6 is a graph for explaining a difference due to a clock deviation in the information processing system 100 illustrated in FIG. 1. FIG. 7 is a graph for explaining correction of the difference due to the clock deviation in the information processing system 100 illustrated in FIG. 1.

The time having been offset due to the clock deviation is not corrected, but the time offset is minimized by the clock deviation. This also reduces a temporary time offset due to the clock deviation between the master device 2 and the slave device 1 (for instance, a time difference that is generated between time correction timings).

In the example illustrated in FIG. 6, the time difference between the master device 2 and the slave device 1 increases as the elapsed time increases. The time difference due to the clock deviations may be reduced by correcting the time increment amount as illustrated in FIG. 7.

Figure 8:
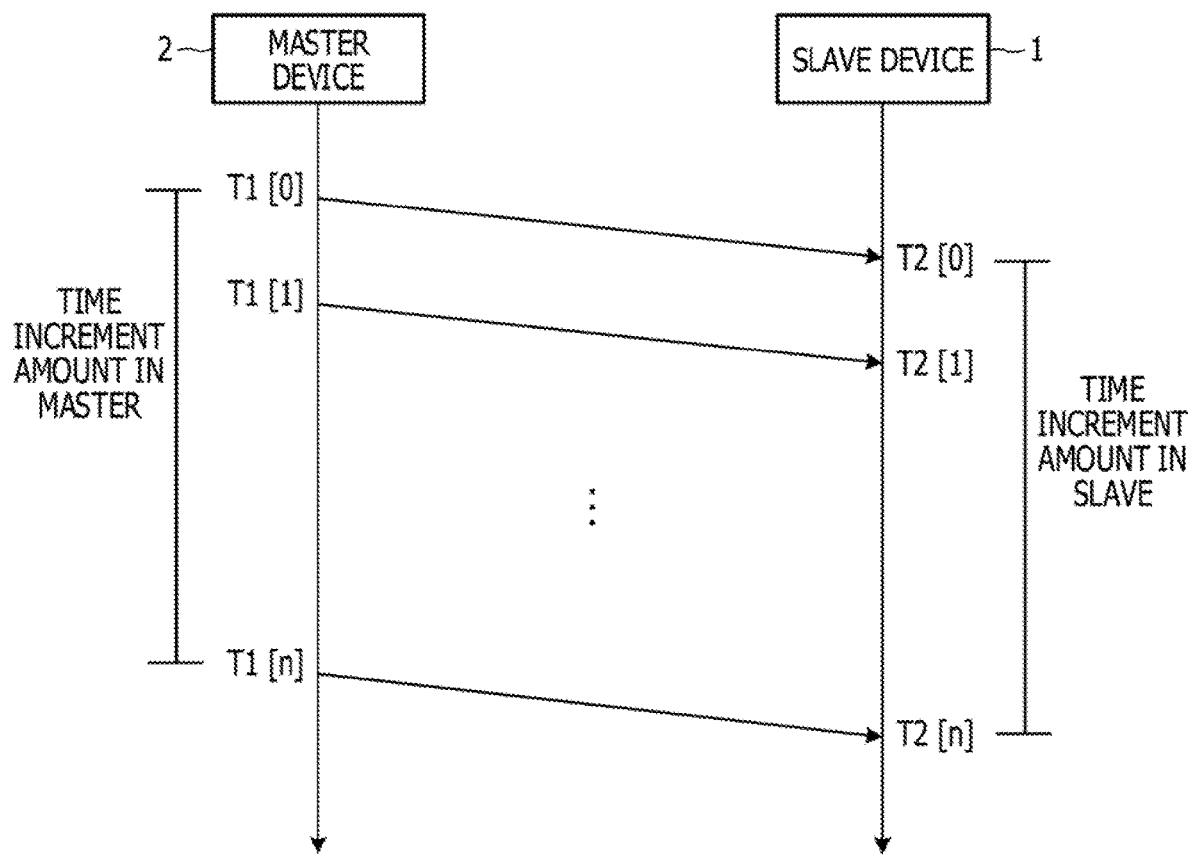
FIG. 8 is a sequence diagram for explaining a process of measuring time increment amounts in a master device and the slave device illustrated in FIG. 1.

FIG. 8 is a sequence diagram for explaining a process of measuring the time increment amounts in the master device 2 and the slave device 1 illustrated in FIG. 1.

In the calibration process, the offset correction is not executed, but only the calculation of the clock deviation and the measurement of the transmission path delay are executed.

The clock deviation may be calculated by measuring a difference in time increment amount between the master device 2 and the slave device 1. Two or more times of transmission of the time information of the master device 2 from the master device 2 to the slave device 1 enables calculation of the time increment amount in the slave device 1 relative to the time increment amount in the master device 2.

In the example illustrated in FIG. 8, at each of time points T1[0] to T1[n], the master device 2 transmits a packet containing the time information T1 in the master device 2 to the slave device 1. As a result, the slave device 1 is enabled to calculate an increment amount between the time points T1 in the master device 2 and an increment amount between the time points T2 in the slave device 1.

An increment ratio δ of the time increment in the slave device 1 to the time increment in the master device 2 is expressed by the following formula (5). The calculated increment ratio δ is used to collect the clock deviation in the routine process.

$$\delta = \frac{T2[n] - T2[0]}{T1[n] - T1[0]} \qquad (5)$$

The measurement of the transmission path delay is executed by using four types of messages sync, FollowUp, Delay_Req, and Delay_Resp as in the usual PTP. In this measurement, an average value of two or more delays may be employed as a delay for use in the routine process by taking traffic fluctuation into consideration.

The calculation of the clock deviation and the measurement of the transmission path delay may be executed simultaneously.

In the routine process after the calibration process, the clock deviation correction and the offset correction are executed. It is monitored whether any of the clock deviation and the transmission path delay varies from the clock deviation or the transmission path delay measured in the calibration process.

At the clock deviation correction in the routine process, the clock deviation obtained in the calibration process is corrected. The time difference due to the clock deviation between the master device 2 and the slave device 1 is calculated and the correction is executed multiple times at high frequency. When δ denotes the increment ratio of the time increment amount in the slave device 1 to the time increment in the master device 2, a time difference DiffTime[m] between the master device 2 and the slave device 1 at a timing when m seconds elapse in the master device 2 is obtained in accordance with the following formula (6).

$$\text{DiffTime}[m] = m - m*\delta \tag{6}$$

Since the time is offset just by DiffTime[m] for m seconds, the correction of time by DiffTime[m] per m seconds enables the time passages in the different devices to be set in line with each other. At the clock deviation correction, it is desirable to correct the time at every clock, and the correction is executed such that the time offset between the devices is kept to at longest 1 μs. For example, when a time offset due to a clock deviation between the master device 2 and the slave device 1 is 1 ms for 1 second, the clock deviation correction is executed through at least 1000 or more divided corrections for 1 second in order to achieve a time synchronization accuracy of 1 μs or less.

Figure 9:
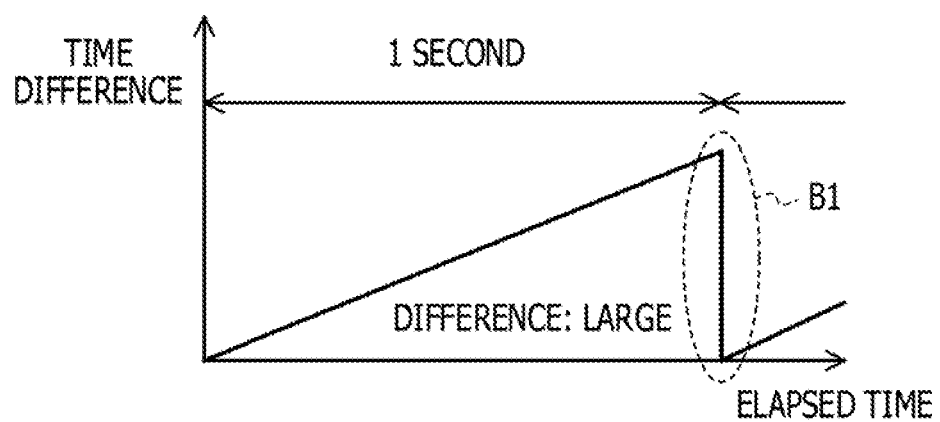
FIG. 9 is a graph for explaining correction of a time difference between the master device and the slave device illustrated in FIG. 1.
Figure 10:
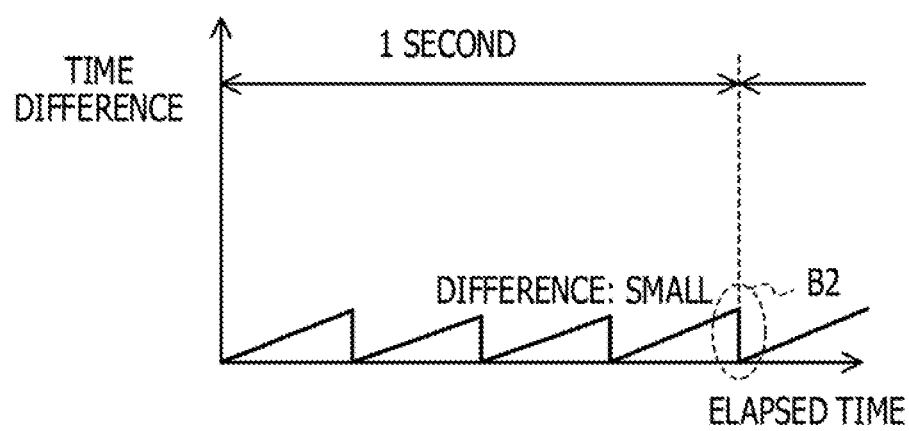
FIG. 10 is a graph for explaining division of the correction of the time difference between the master device and the slave device illustrated in FIG. 1.

FIG. 9 is a graph for explaining correction of a time difference between the master device 2 and the slave device 1 illustrated in FIG. 1. FIG. 10 is a graph for explaining division of the correction of the time difference between the master device 2 and the slave device 1 illustrated in FIG. 1.

As illustrated in FIG. 9, when the clock deviation correction is executed once for 1 second, the time difference between the master device 2 and the slave device 1 becomes large (see reference sign B1).

On the other hand, as illustrated in FIG. 10, when the clock deviation correction is executed multiple times for 1 second, the time difference between the master device 2 and the slave device 1 is kept small (see reference sign B2).

Figure 11:
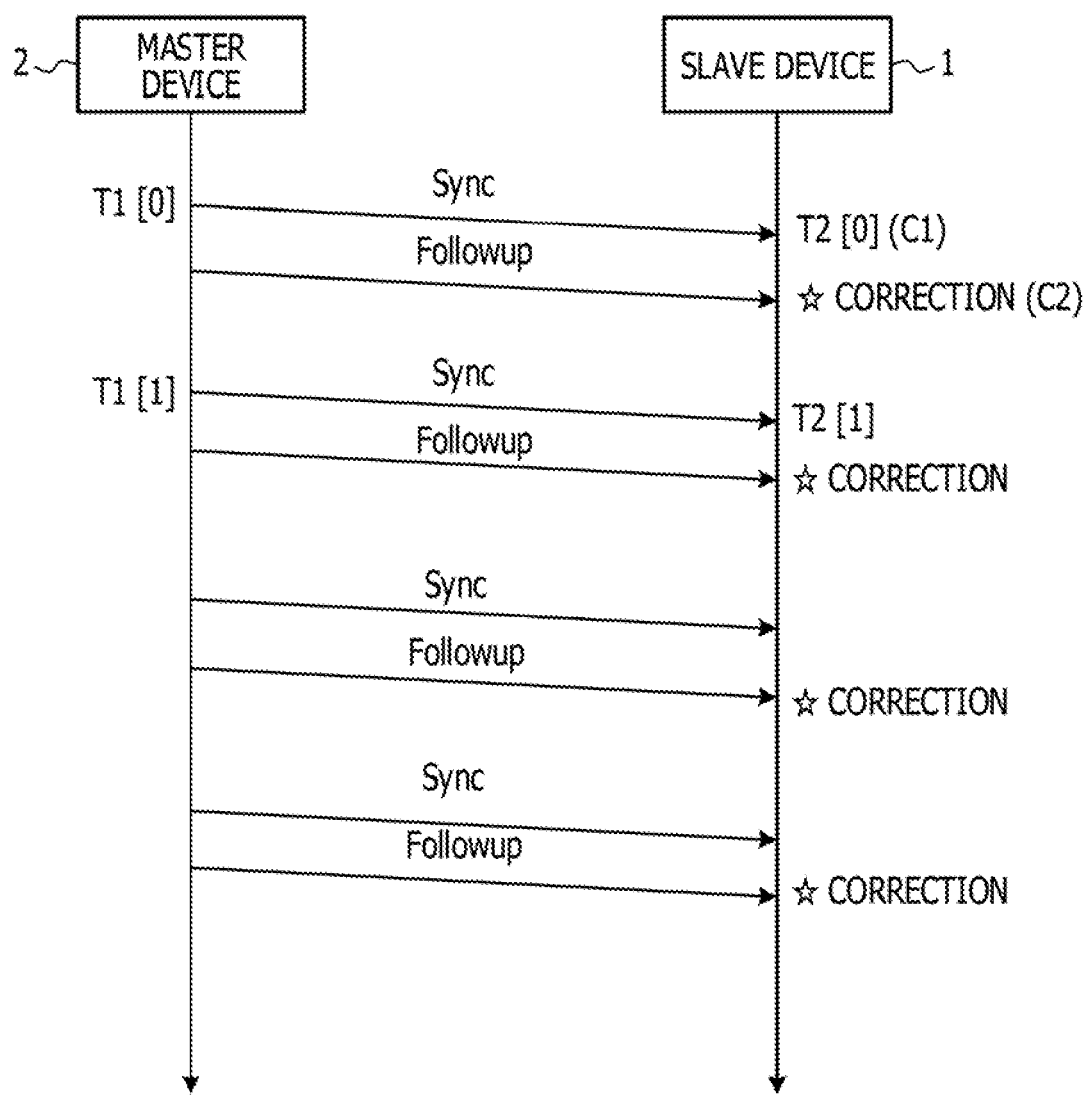
FIG. 11 is a sequence diagram for explaining a time synchronization process between the master device and the slave device illustrated in FIG. 1.

FIG. 11 is a sequence diagram for explaining the time synchronization process between the master device 2 and the slave device 1 illustrated in FIG. 1.

In the offset correction, the offset may be calculated by way of transmission of sync and FollowUp because the delay is already calculated. As illustrated in FIG. 11, sync and FollowUp are transmitted from the master device 2 to the slave device 1 (see reference signs C1 and C2), and the offset value is calculated. The slave device 1 corrects the time information by the calculated offset, so that the time in the slave device 1 is synchronized with the time in the master device 2.

Figure 12:
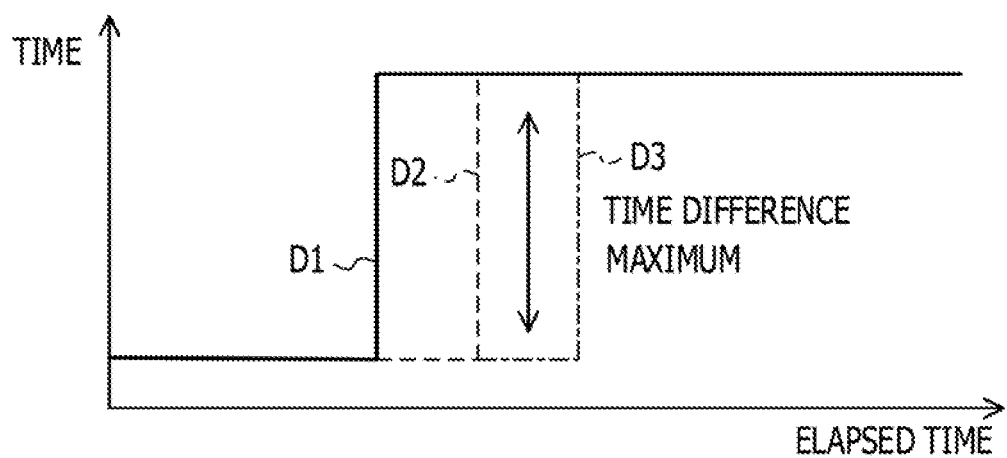
FIG. 12 is a graph for explaining a batch correction process of time information in a related example.
Figure 13:
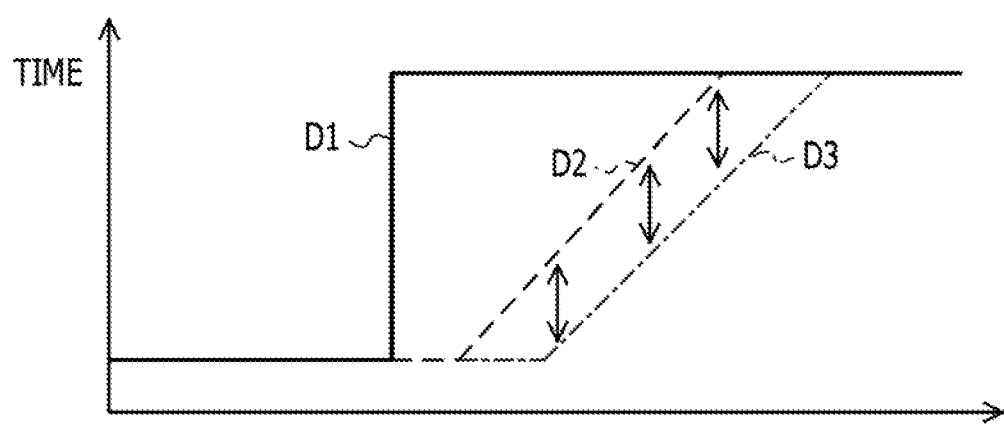
FIG. 13 is a graph for explaining a divided correction process of the time information in the information processing system illustrated in FIG. 1.

FIG. 12 is a graph for explaining a batch correction process of time information in a related example. FIG. 13 is a graph for explaining a divided correction process of the time information in the information processing system 100 illustrated in FIG. 1.

In some systems, the absence of a difference in the time information between the multiple slave devices 1 is considered to take priority over the accuracy of the time synchronization between the master device 2 and the slave device 1.

When the transmission path delay is different among the multiple slave devices 1, the timing for the offset correction varies among the slave devices 1. This results in a temporary time offset among the slave devices 1. To address this, the time difference among the slaves may be reduced through divided corrections of the offset.

In FIGS. 12 and 13, reference sign D1 indicates time information in the master device 2, reference sign D2 indicates time information in the slave device #1, and reference sign D3 indicates time information in the slave device #2.

As illustrated in FIG. 12, when the batch correction process of the time information is executed, the time difference is maximized. On the other hand, as illustrated in FIG. 13, when the divided correction process of the time information is executed, the time difference is kept small.

Figure 14:
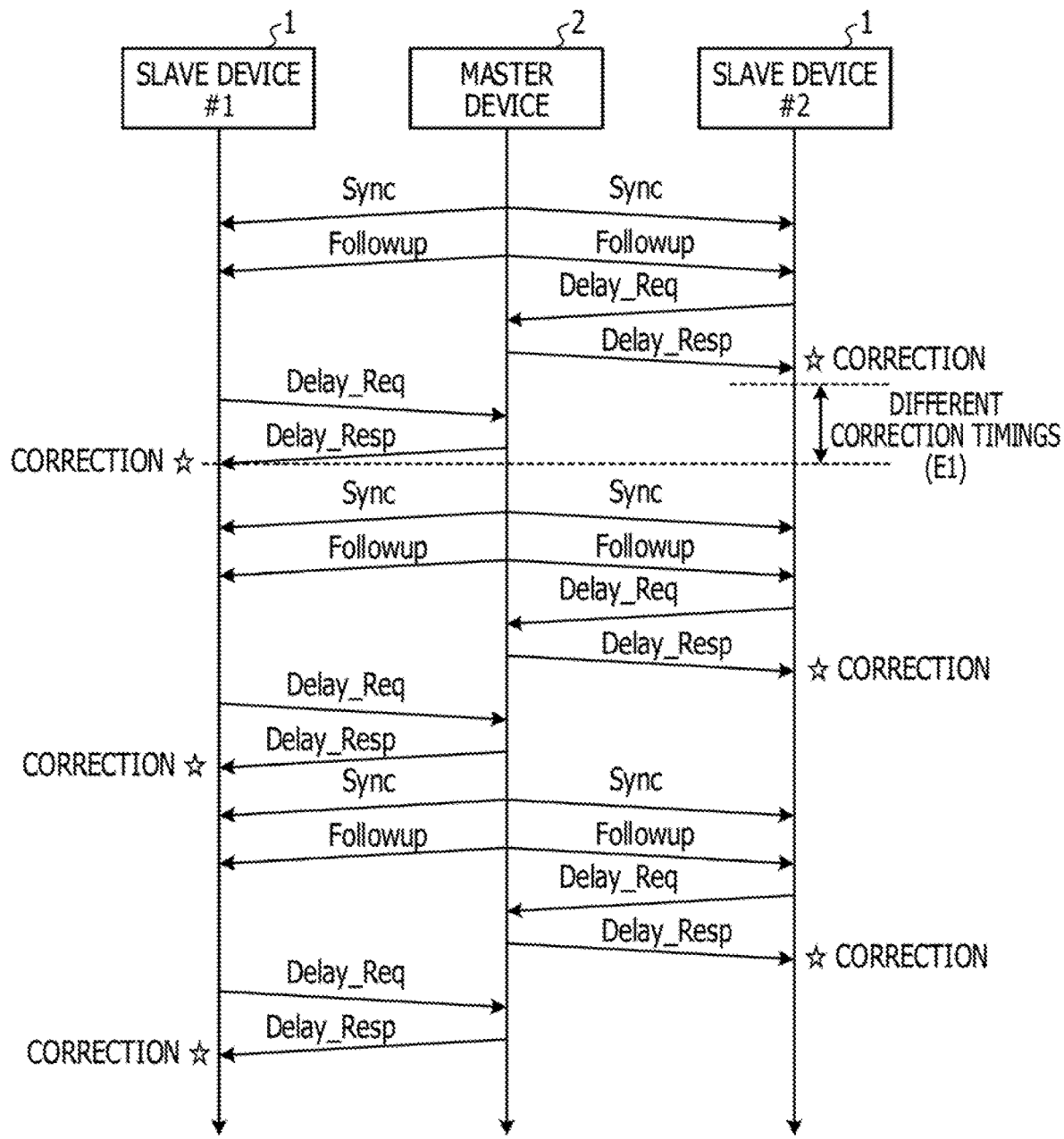
FIG. 14 is a sequence diagram for explaining a PTP-based time synchronization process in a related example.
Figure 15:
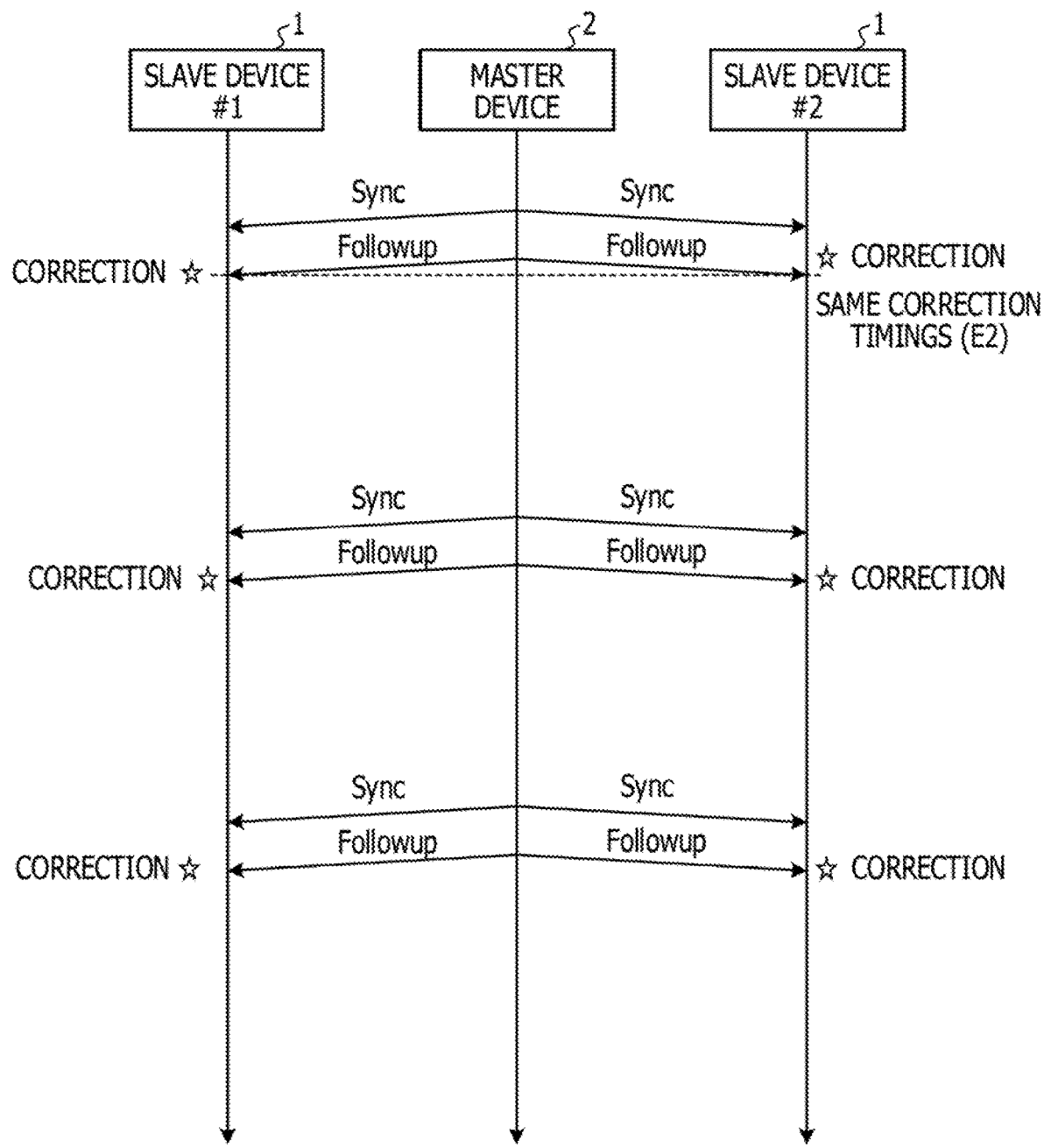
FIG. 15 is a sequence diagram for explaining a PTP-based time synchronization process in the information processing system illustrated in FIG. 1.

FIG. 14 is a sequence diagram for explaining a PTP-based time synchronization process in a related example. FIG. 15 is a sequence diagram for explaining a PTP-based time synchronization process in the information processing system 100 illustrated in FIG. 1.

As for the offset correction timing, the slave devices 1 execute the time correction at the timing when the slave devices 1 receive sync or FollowUp broadcasted by the master device 2, and thus the timing for executing the time correction is the same between the slave devices 1.

In the related example illustrated in FIG. 14, each slave device 1 executes the correction at the timing when the slave device 1 receives Delay_Resp from the master device 2. As a result, the correction timing varies between the slave device #1 and the slave device #2 (see reference sign E1).

On the other hand, in the example of the embodiment illustrated in FIG. 15, each slave device 1 executes the correction at the timing when the slave device 1 receives FollowUp broadcasted from the master device 2. As a result, the correction timing is the same between the slave device #1 and the slave device #2 (see reference sign E2).

Figure 16:
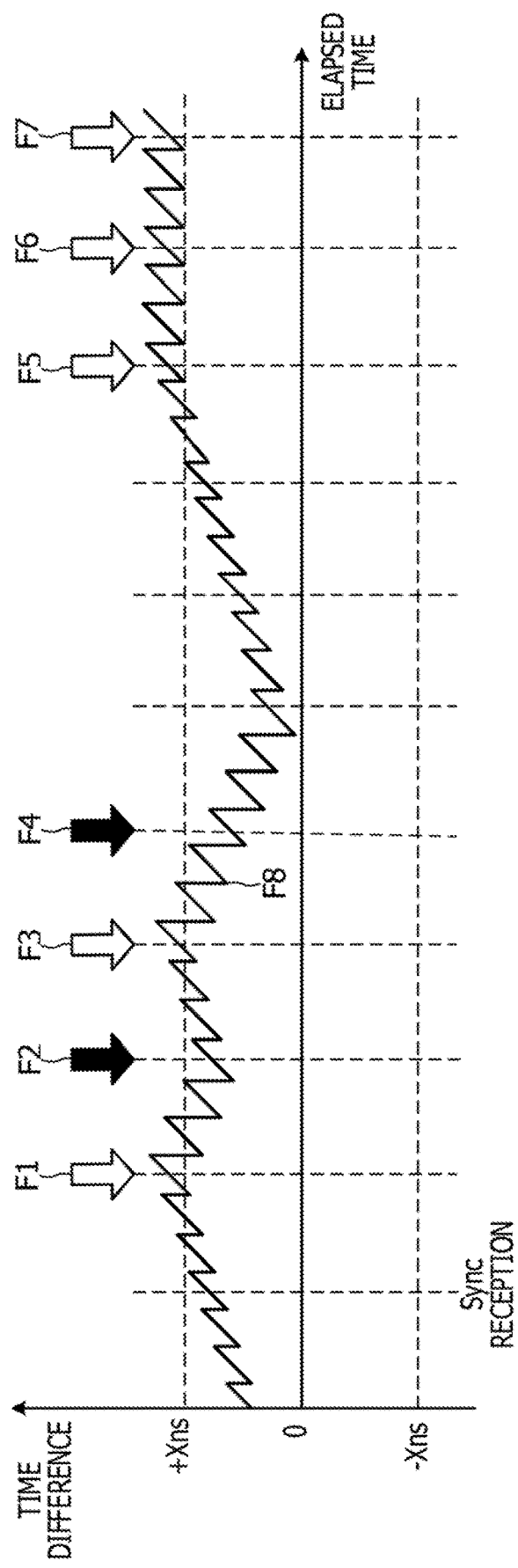
FIG. 16 is a graph for explaining a variation detection count of an offset and a transmission path delay in the information processing system illustrated in FIG. 1.

FIG. 16 is a graph for explaining a variation detection count of the offset and the transmission path delay in the information processing system 100 illustrated in FIG. 1.

In order to cope with a variation in the transmission path delay due to a change in the network configuration, the offset value is monitored and the delay is updated when a variation in the offset value is detected.

For the offset correction value, certain thresholds in plus and minus directions are set. When the offset value exceeds any of these thresholds, a counter for variation detection is incremented, and the slave device 1 issues Delay_Req to the master device 2 (see reference signs F1, F3, and F5 to F7).

The value of the transmission path delay calculated based on this Delay_Req/Delay_Resp is stored in Delay_Temp. When the counter value reaches a prescribed value, the average value of the values stored so far in Delay_Temp is calculated and is set as the delay value for the offset calculation.

When the offset value does not exceed the threshold or exceeds the threshold in the opposite direction, the counter is reset (see reference signs F2 and F4).

When the variation is detected, the delay value calculated at the moment of the variation detection may be used, or the calibration process may be re-executed to measure the delay value again.

Figure 17:
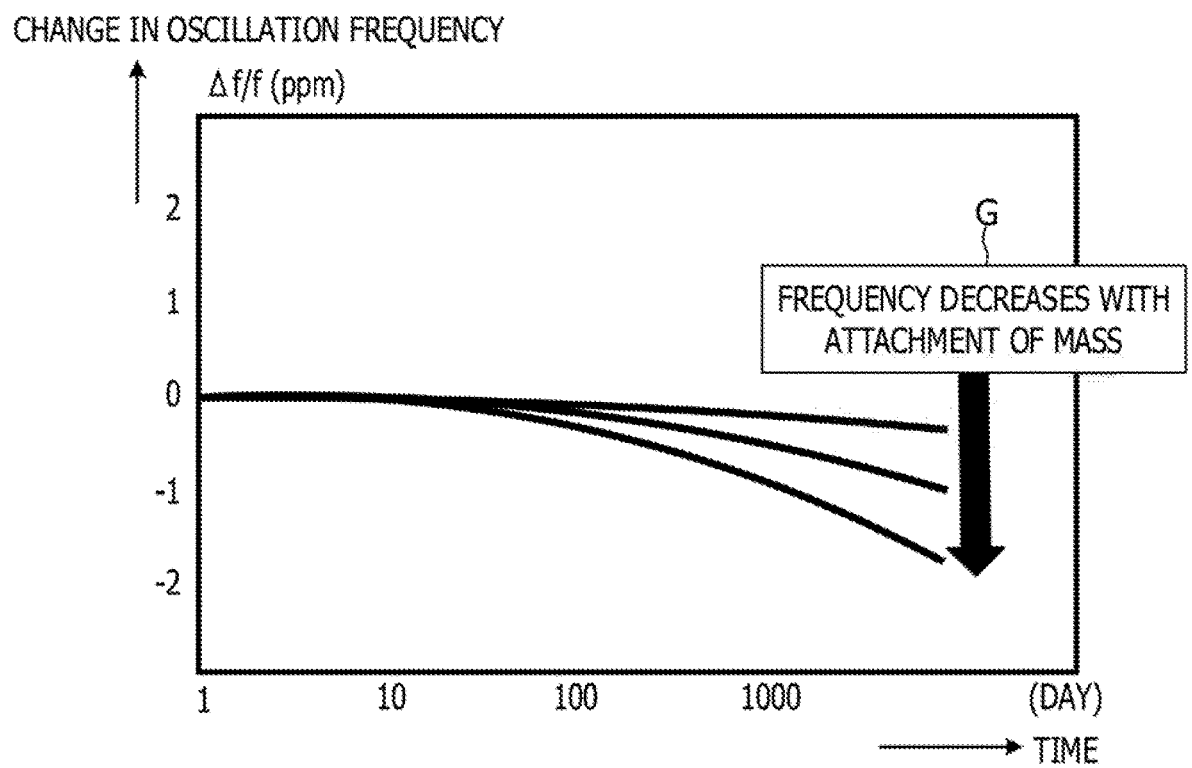
FIG. 17 is a graph for explaining a variation in the clock deviation due to aging deterioration in the information processing system illustrated in FIG. 1.

FIG. 17 is a graph for explaining a variation in the clock deviation due to aging deterioration in the information processing system 100 illustrated in FIG. 1.

The clock deviation may vary due to aging deterioration. As illustrated in FIG. 17, when mass is attached to the clock, the frequency is decreased (see reference sign G).

When this variation in the clock deviation is detected, the correction amount for the clock deviation is changed. An observation period for variation detection is set to a time period equal to or longer than a calibration period. When an observation is terminated once, the next observation may be started.

The offset values for the observation period are accumulated. Then, as in the case of the calibration process, the difference between the time increment amount in the master device 2 and the time increment amount in the slave device 1 is calculated, and thereby the difference in the clock deviation is calculated. A cumulative sum of the correction values calculated herein is reset at every observation period.

When CLK_Dev denotes a correction value for the clock deviation, a cumulative sum CorrSum of the offset correction values and the clock deviation correction values for a given period is expressed by the following formula (7).

$$\text{CorrSum} = \Sigma \text{offset} + \Sigma \text{CLK\_Dev} \quad (7)$$

The increment ratio δ of the time increment in the slave device 1 to the time increment in the master device 2 is expressed by the following formula (8).

$$\delta = \frac{T2[n] - T2[0] - \text{CorrSum}}{T1[n] - T1[0]} \quad (8)$$

The newly calculated increment ratio δ and the existing increment ratio δ are compared with each other. When an offset of 1 ns or longer per second occurs, the clock deviation is determined as having varied, and the correction amount for the clock deviation is updated.

[A-2] Operation Example

Figure 18:
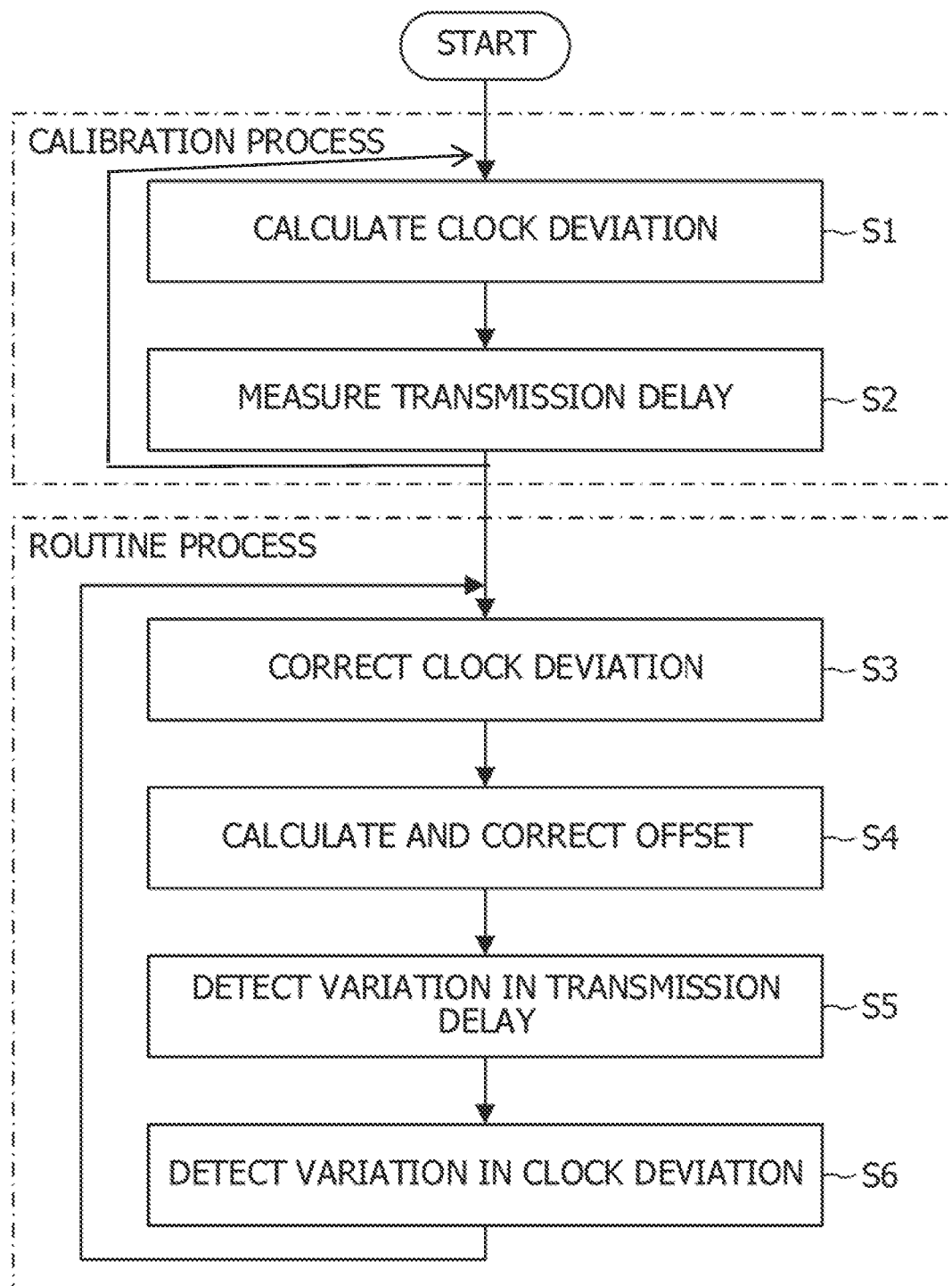
FIG. 18 is a flowchart for explaining a time synchronization process in the slave device illustrated in FIG. 1.

The time synchronization process in the slave device 1 illustrated in FIG. 1 is described with reference to a flowchart (operations S1 to S6) illustrated in FIG. 18.

The time synchronization process is divided into a calibration process phase at operations S1 and S2 and a routine process phase at operations S3 to S6.

In the calibration process phase, the calibration processing unit 115 calculates the clock deviation between the master device 2 and the slave device 1 (operation S1).

The calibration processing unit 115 measures the transmission path delay between the master device 2 and the slave device 1 (operation S2).

In the routine process phase, the clock deviation corrector 112 corrects the clock deviation calculated in the calibration process (operation S3).

The offset corrector 113 calculates and corrects the offset in the slave device 1 (operation S4).

The variation detector 114 detects a variation in the transmission path delay between the master device 2 and the slave device 1 (operation S5).

The variation detector 114 detects a variation in the clock deviation between the master device 2 and the slave device 1 (operation S6). The processing returns to operation S3, and the processing in the routine process phase is iterated.

Figure 19:
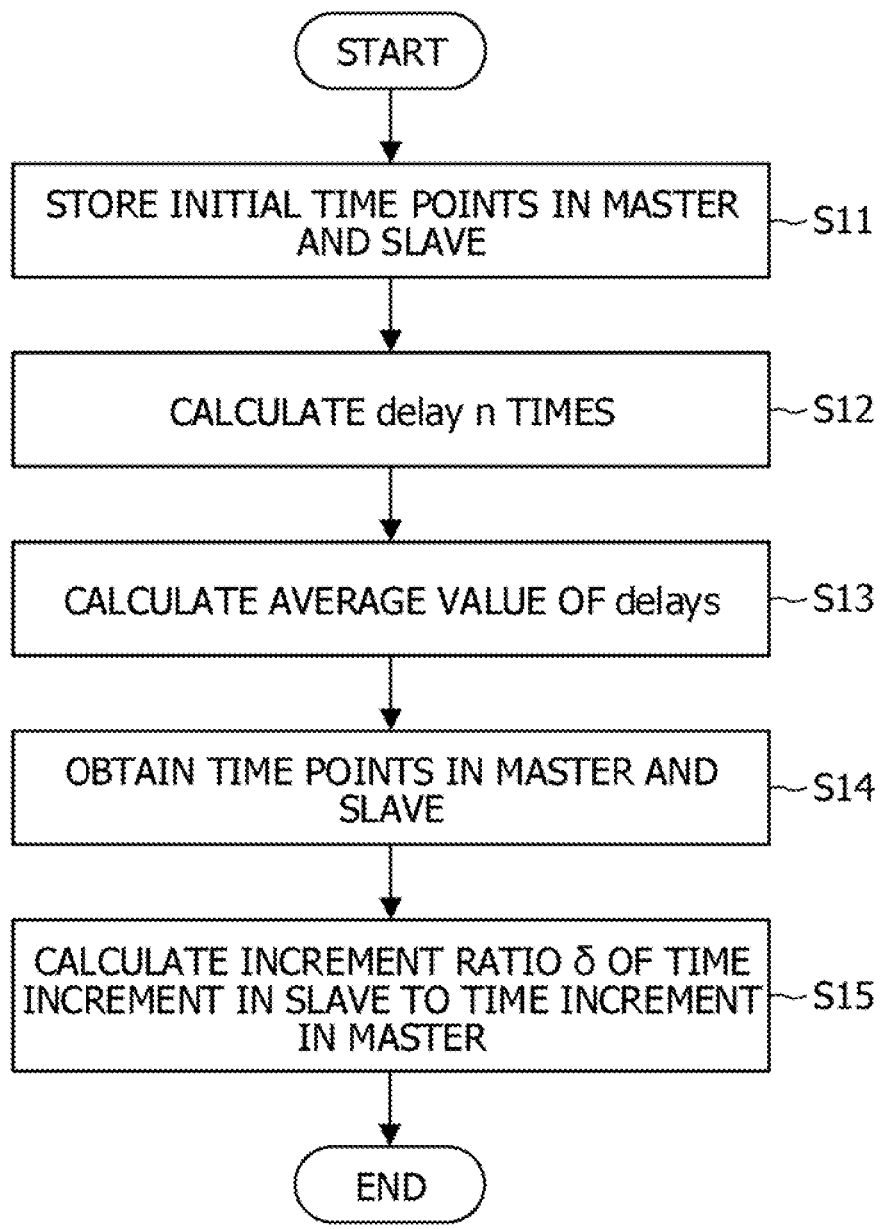
FIG. 19 is a flowchart for explaining a calibration process in the slave device illustrated in FIG. 1.

Next, a calibration process in the slave device 1 illustrated in FIG. 1 is described with reference to a flowchart (operations S11 to S15) illustrated in FIG. 19.

The calibration processing unit 115 stores the initial time points in the master device 2 and the slave device 1 (operation S11).

The calibration processing unit 115 calculates the transmission path delay between the master device 2 and the slave device 1 n times (operation S12).

The calibration processing unit 115 calculates the average value of the n delays thus calculated (operation S13).

The calibration processing unit 115 obtains the time points in the master device 2 and the slave device 1 (operation S14).

The calibration processing unit 115 calculates the increment ratio δ of the time increment in the slave device 1 to the time increment in the master device 2 based on the time points at operation S11 and the time points at operation S14 in the master device 2 and the slave device 1 (operation S15). The calibration process ends.

Figure 20:
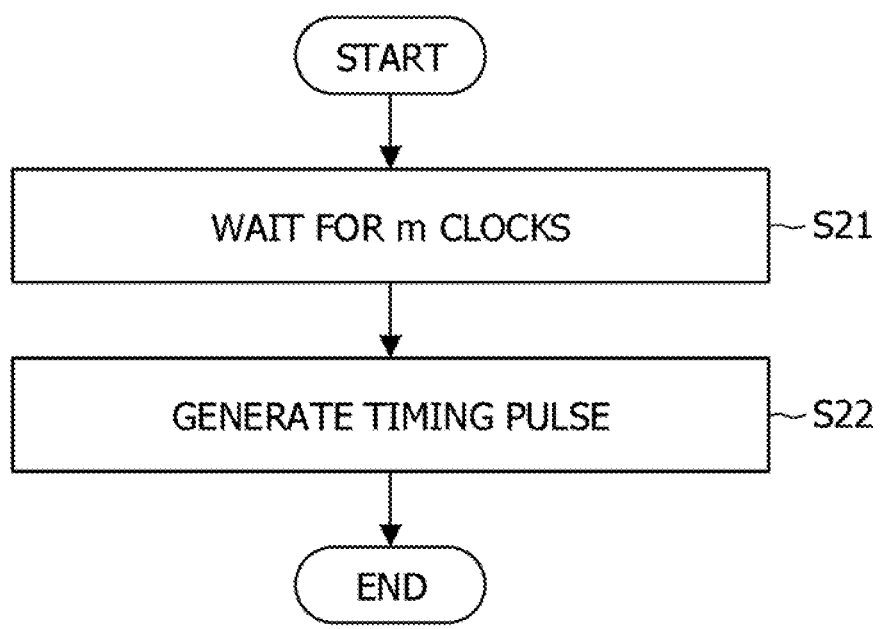
FIG. 20 is a flowchart for explaining a timing generation process in the slave device illustrated in FIG. 1.

Next, a timing generation process in the slave device 1 illustrated in FIG. 1 is described with reference to a flowchart (operations S21 and S22) illustrated in FIG. 20.

The timing generator 111 waits for m clocks (operation S21).

The timing generator 111 generates a timing pulse and inputs the timing pulse to the clock deviation corrector 112 (operation S22). The timing generation process ends.

Figure 21:
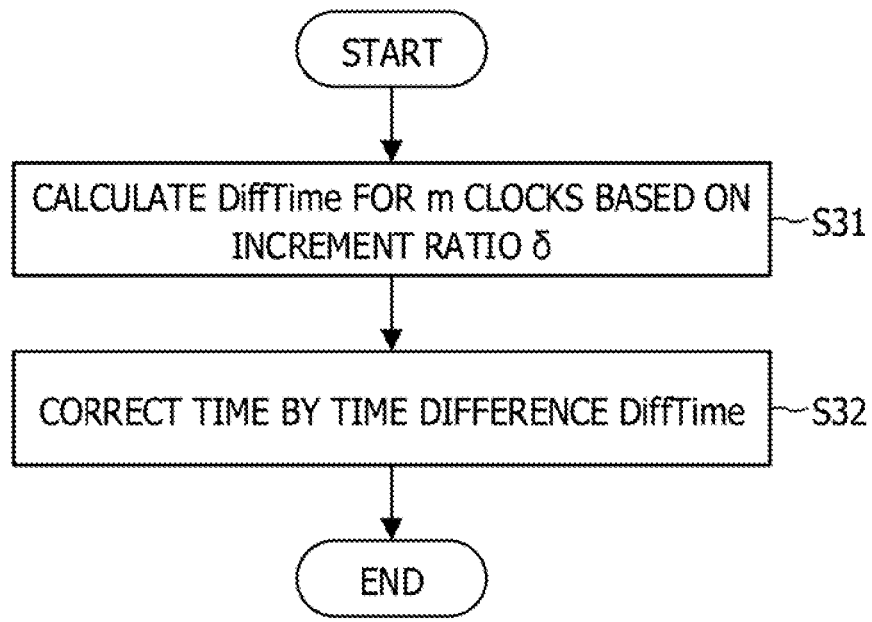
FIG. 21 is a flowchart for explaining a clock deviation correction process in the slave device illustrated in FIG. 1.

Next, a clock deviation correction process in the slave device 1 illustrated in FIG. 1 is described with reference to a flowchart (operations S31 and S32) illustrated in FIG. 21.

The clock deviation corrector 112 calculates a time difference DiffTime between the master device 2 and the slave device 1 within a period of m clocks based on the increment ratio δ of the time increment in the slave device 1 to the time increment in the master device 2 calculated in the calibration process (operation S31).

The clock deviation corrector 112 corrects the time by the calculated time difference DiffTime in the slave device 1 (operation S32). The clock deviation correction process ends.

Figure 22:
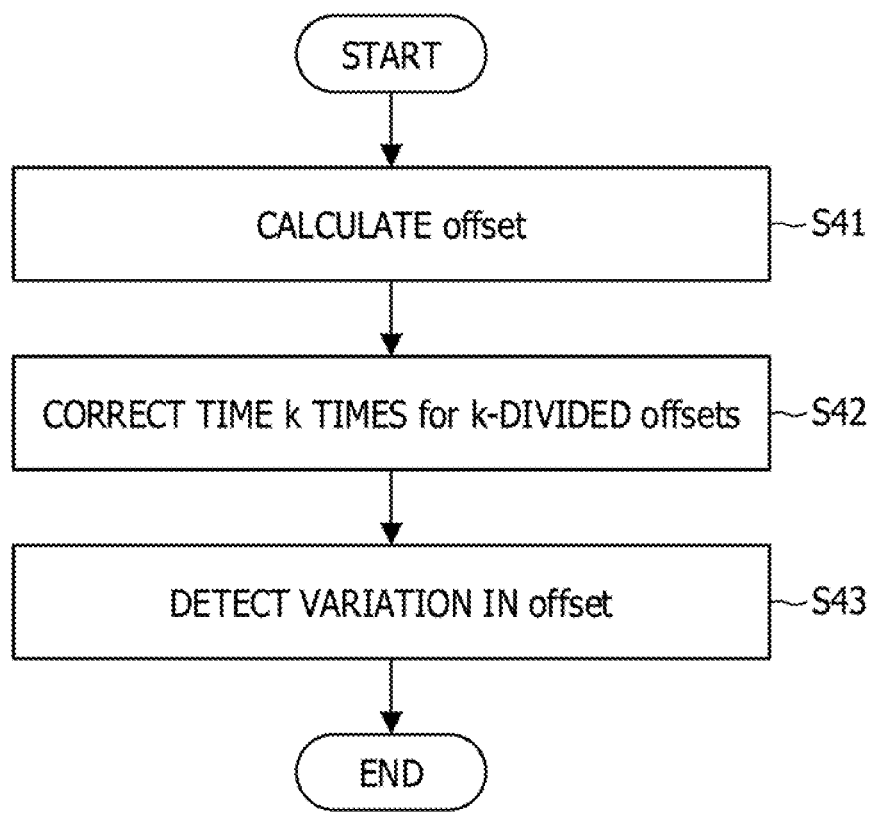
FIG. 22 is a flowchart for explaining an offset correction process in the slave device illustrated in FIG. 1.

Next, an offset correction process in the slave device 1 illustrated in FIG. 1 is described with reference to a flowchart (operations S41 to S43) illustrated in FIG. 22.

The offset corrector 113 calculates the time offset between the master device 2 and the slave device 1 in response to reception of sync and FollowUp from the master device 2 (operation S41).

The offset corrector 113 corrects the time k times for the k-divided offsets (operation S42). Thus, even in the case where the transmission path delay differs between multiple slave devices 1, it is possible to reduce a temporary time offset between the multiple slave devices 1 due to a difference in the offset correction timing between the slave devices 1.

The variation detector 114 detects a variation in the offset (operation S43). The offset correction process ends.

Figure 23:
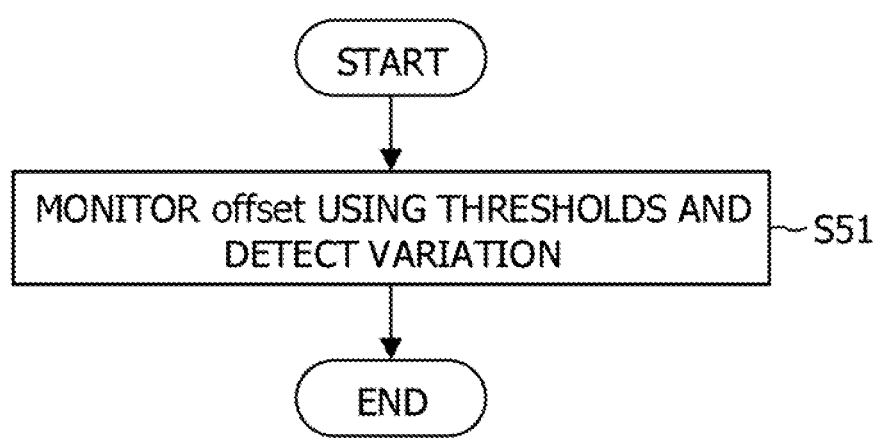
FIG. 23 is a flowchart for explaining a variation detection process in the slave device illustrated in FIG. 1.

Next, a variation detection process in the slave device 1 illustrated in FIG. 1 is described with reference to a flowchart (operation S51) illustrated in FIG. 23.

The variation detector 114 detects a variation in the offset when the offset calculated by the offset corrector 113 exceeds the threshold a prescribed number of times consecutively (operation S51). The variation detection process ends.

[A-3] Effects

Figure 24:
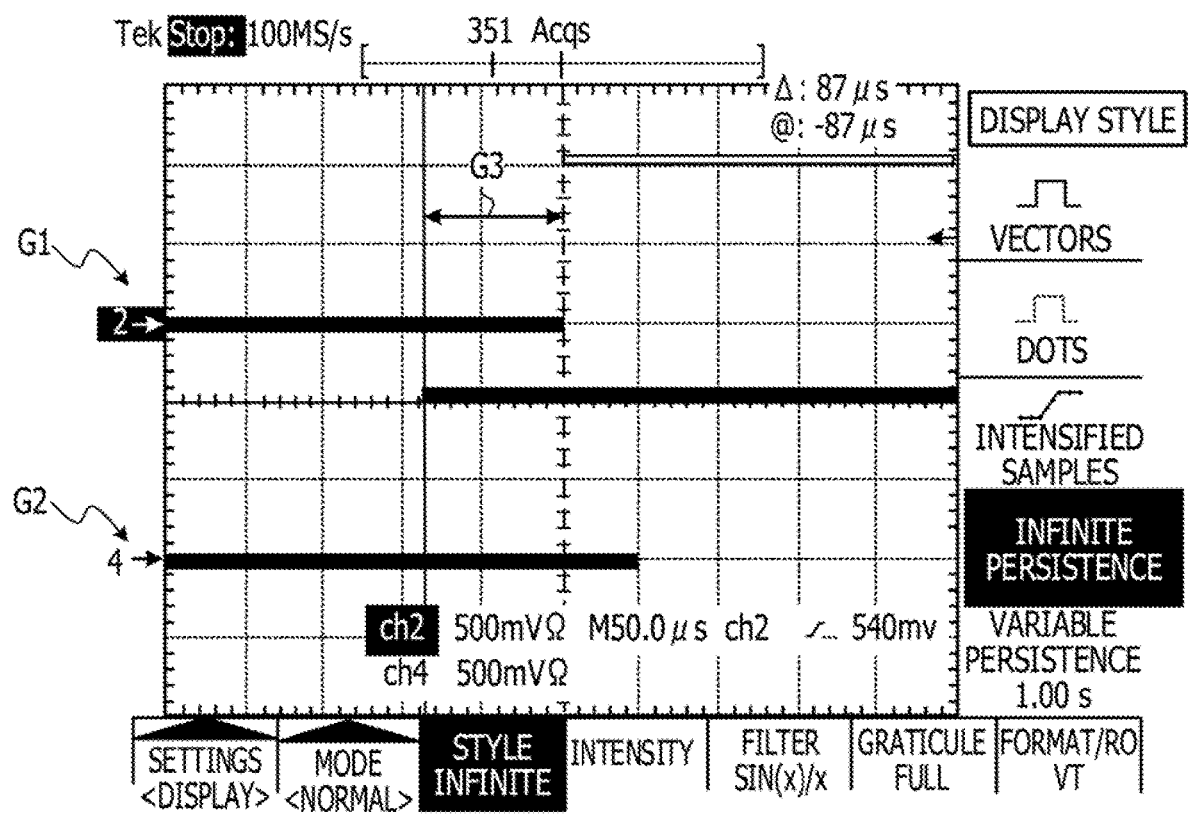
FIG. 24 is a graph illustrating an example of the greatest value of a time difference in a minus direction between devices in a related example.

FIG. 24 is a graph illustrating an example of the greatest value of a time difference in a minus direction between devices in a related example. FIG. is a graph illustrating an example of the greatest value of a time difference in a plus direction between the devices in the related example.

Figure 25:
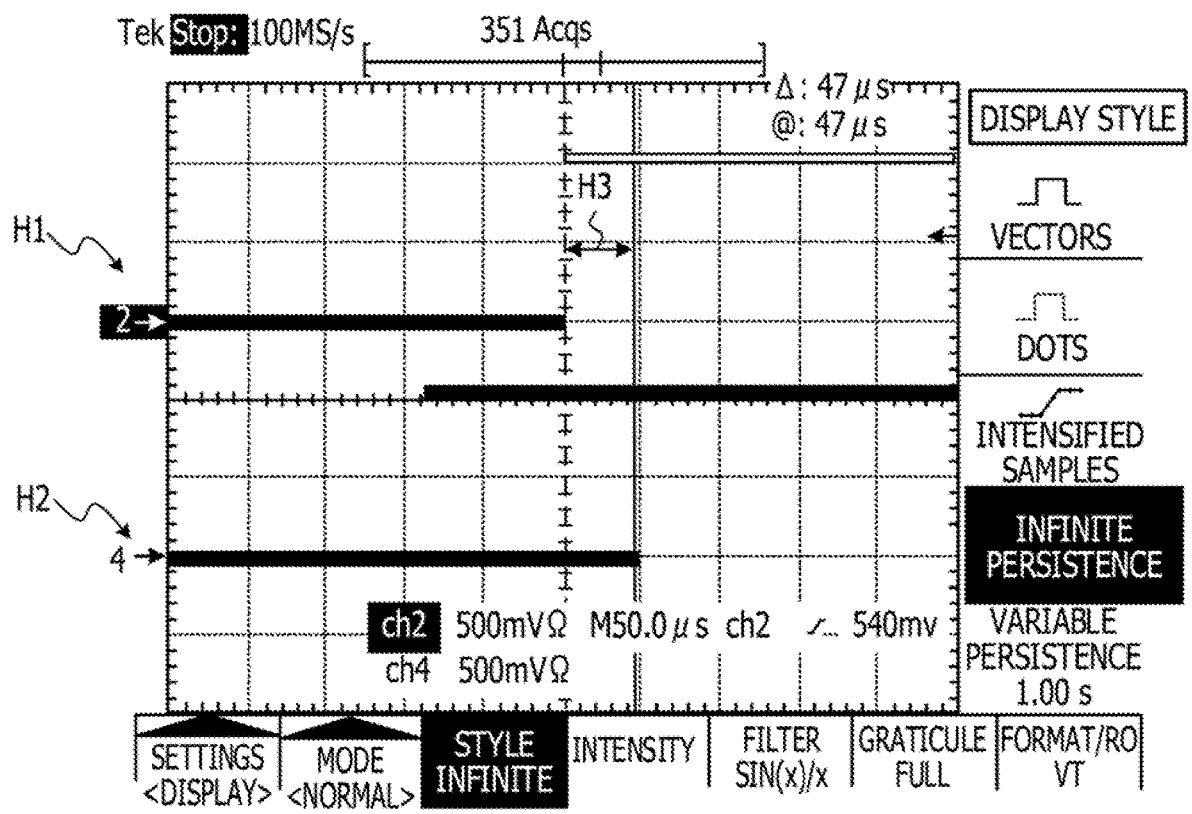
FIG. 25 is a graph illustrating an example of the greatest value of a time difference in a plus direction between the devices in the related example.

FIGS. 24 and 25 each illustrate a result of measurement of the greatest value of the time difference between the slave devices 1 for one hour.

In FIG. 24, reference sign G1 indicates the time in the slave device #1 and reference sign G2 indicates the time in the slave device #2. Then, reference sign G3 indicates the greatest time difference in the minus direction between the slave device #1 and the slave device #2.

In FIG. 25, reference sign H1 indicates the time in the slave device #1 and reference sign H2 indicates the time in the slave device #2. Then, reference sign H3 indicates the greatest time difference in the plus direction between the slave device #1 and the slave device #2.

As illustrated in FIGS. 24 and 25, even though the times in the master device and the slave device are synchronized to each other by way of PTP, the times may offset by the next correction timing.

When a general-purpose PCIe device is used as a slave device, the clock deviation of the oscillator is ±100 ppm, which is the Ethernet (registered trademark) standard, and an offset in the order of at longest 100 µs per second may occur between the grand master and the slave device.

For this reason, an offset of at longest 200 ppm per second may occur between a slave device with an offset in the plus direction and a slave device with an offset in the minus direction. The time offset due to the clock deviation is one of the factors for accuracy deterioration of time synchronization as described above.

According to the PTP standard, an interval for issuing sync/FollowUp may be set to 1 to 64 times/s. The time correction interval in the slaves may be shortened by shortening the interval for issuing sync/FollowUp. If the time is corrected 64 times for one second and the clock deviation is ±100 ppm, the time offset between the master device and the slave device is about 1.57 µs, which means that it is impossible to achieve time synchronization with an accuracy of 1 µs or less.

Most of usual PCIe cards are not equipped with highly accurate oscillators. Even if a highly accurate oscillator is tried to be equipped in order to reduce the clock deviation, the highly accurate oscillator is not easy to equip because the peripheral circuit also has to have a configuration sophisticated corresponding to the highly accurate oscillator.

For example, in a network configuration where the grand master transmits packets in accordance with the PTP standard and the slave devices use general-purpose PCIe cards, it is not easy to achieve highly accurate time synchronization achieving a time difference of ±1 µs or less between the devices.

Figure 26:
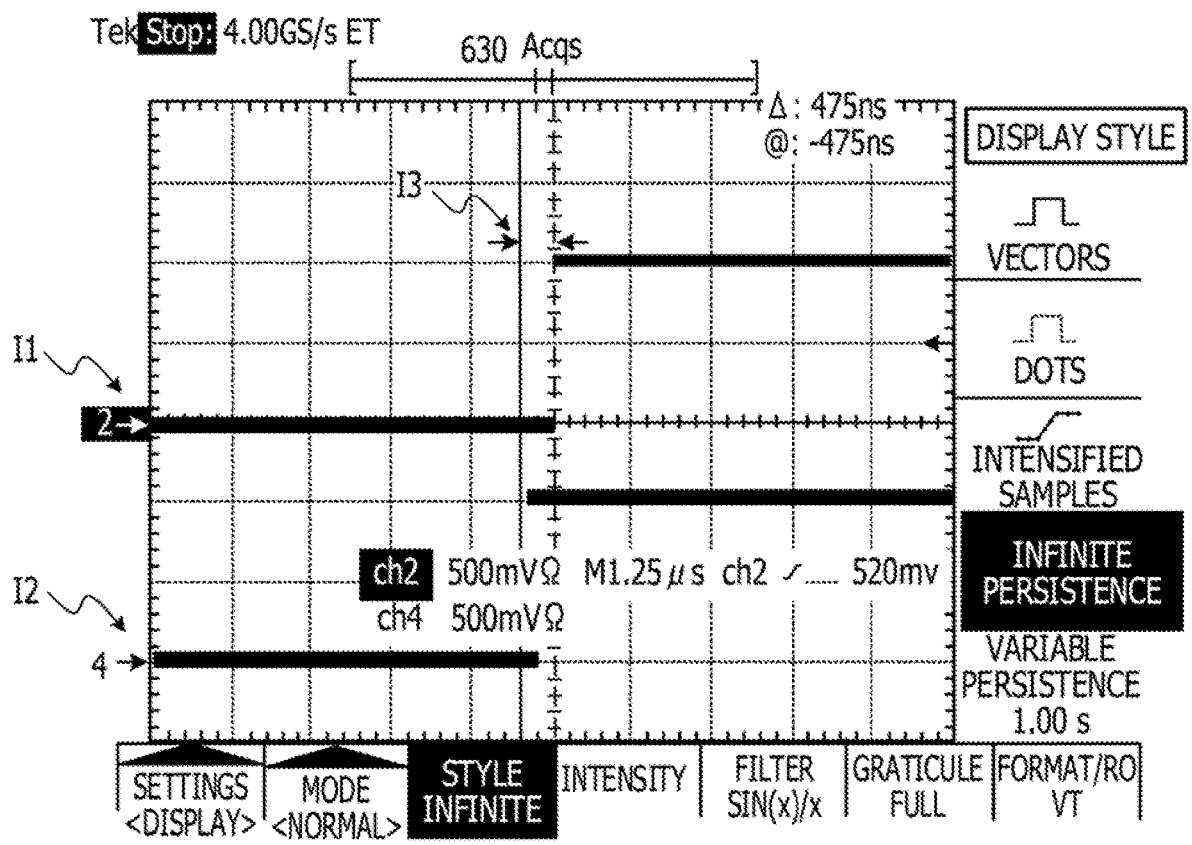
FIG. 26 is a graph illustrating an example of the greatest value of a time difference in a minus direction between the devices in the information processing system illustrated in FIG. 1.
Figure 27:
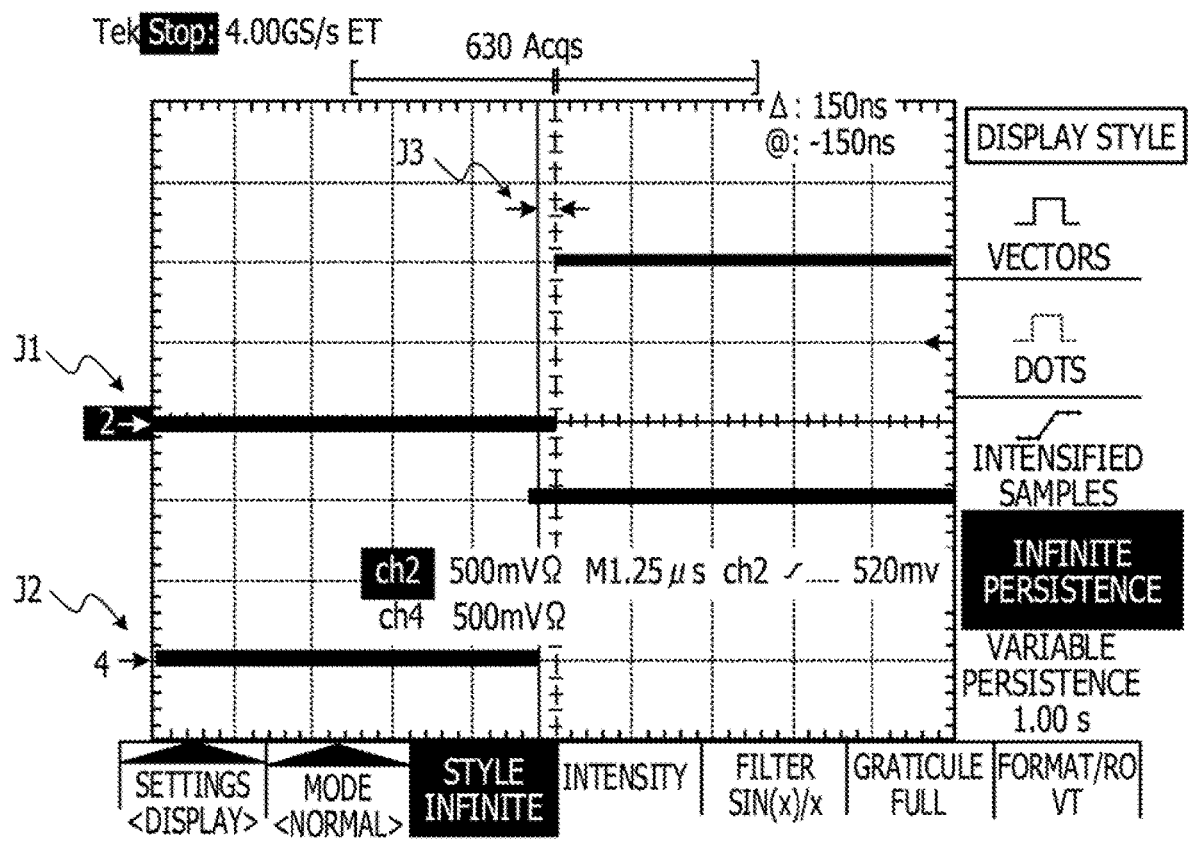
FIG. 27 is a graph illustrating an example of the greatest value of a time difference in a plus direction between the devices in the information processing system illustrated in FIG. 1.

FIG. 26 is a graph illustrating an example of the greatest value of a time difference in a minus direction between the devices in the information processing system 100 illustrated in FIG. 1. FIG. 27 is a graph illustrating an example of the greatest value of a time difference in a plus direction between the devices in the information processing system 100 illustrated in FIG. 1.

FIGS. 26 and 27 each illustrate a result of measurement of the greatest value of the time difference between the slave devices 1 for one hour as in FIGS. 24 and 25.

In FIG. 26, reference sign I1 indicates the time in the slave device #1 and reference sign I2 indicates the time in the slave device #2. Then, reference sign I3 indicates the greatest time difference in the minus direction between the slave device #1 and the slave device #2.

In FIG. 27, reference sign J1 indicates the time in the slave device #1 and reference sign J2 indicates the time in the slave device #2. Then, reference sign J3 indicates the greatest time difference in the plus direction between the slave device #1 and the slave device #2.

The time difference in the minus direction illustrated in FIG. 26 is smaller than the time difference in the minus direction in the related example illustrated in FIG. 24. The time difference in the plus direction illustrated in FIG. 27 is smaller than the time difference in the plus direction in the related example illustrated in FIG. 25.

Figure 28:
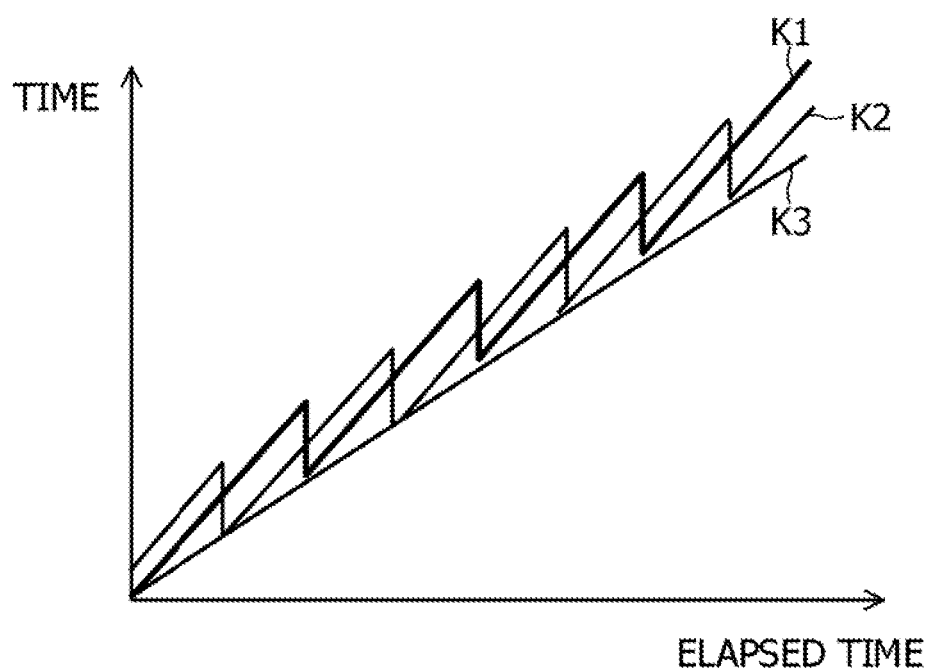
FIG. 28 is a graph illustrating a first example of a time difference between devices in a related example.

FIG. 28 is a graph illustrating a first example of a time difference between devices in a related example.

In the example illustrated in FIG. 28, reference sign K1 indicates the time in the slave device #1, reference sign K2 indicates the time in the slave device #2, and reference sign K3 indicates the time in the master device 2.

In the example illustrated in FIG. 28, a time difference is generated immediately after correction until the next correction timing, and the time difference becomes maximum immediately before correction. A difference in correction timing between the slave devices 1 hinders highly accurate time synchronization between the slave devices 1.

Figure 29:
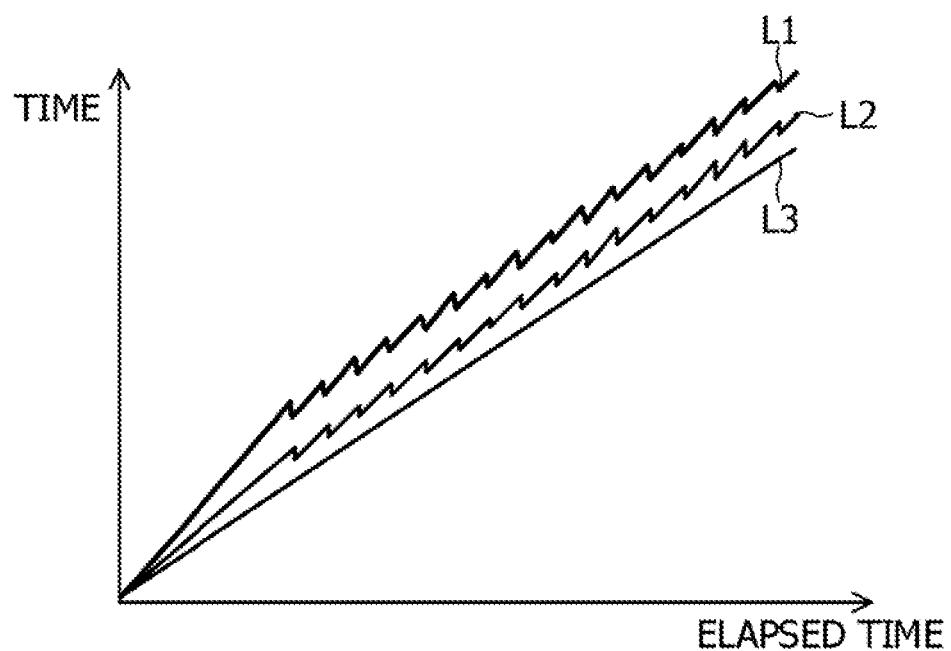
FIG. 29 is a graph illustrating a second example of a time difference between devices in a related example.

FIG. 29 is a graph illustrating a second example of a time difference between devices in a related example.

In the example illustrated in FIG. 29, reference sign L1 indicates the time in the slave device #1, reference sign L2 indicates the time in the slave device #2, and reference sign L3 indicates the time in the master device 2.

As illustrated in FIG. 29, even when the time is corrected dividedly with the offset-divided corrections, the times in the devices deviate from each other during the execution of the corrections and a certain time difference from the master device 2 occurs in each slave device 1.

Figure 30:
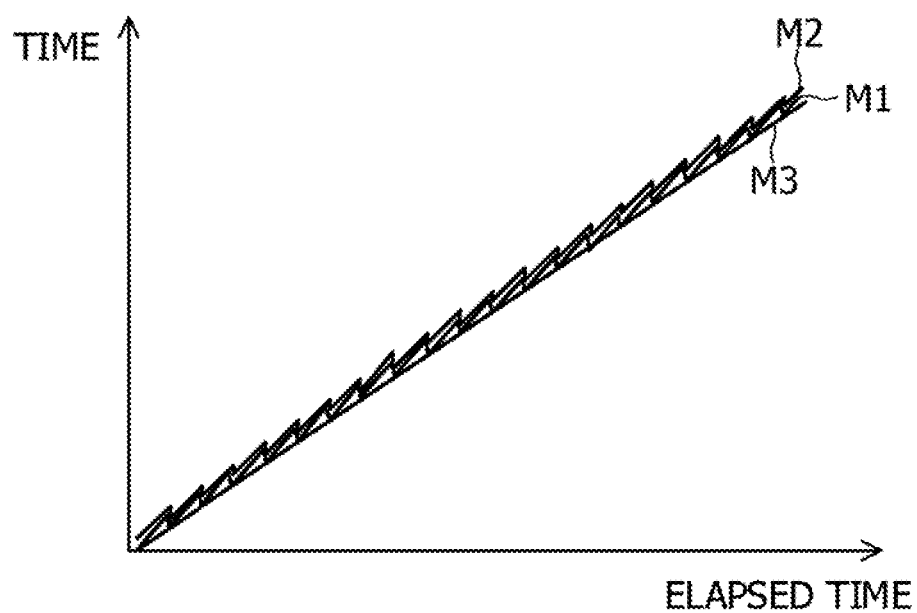
FIG. 30 is a graph illustrating an example of a time difference between the devices in the information processing system illustrated in FIG. 1.

FIG. 30 is a graph illustrating an example of a time difference between the devices in the information processing system 100 illustrated in FIG. 1.

In the example illustrated in FIG. 30, reference sign M1 indicates the time in the slave device #1, reference sign M2 indicates the time in the slave device #2, and reference sign M3 indicates the time in the master device 2.

In the aforementioned example of the embodiment, the time offset due to the clock deviation is calculated, and the clock deviation is accordingly corrected. This makes it possible to reduce the time offset due to the clock deviation between the master device 2 and the slave device 1. Each of the slave devices 1 corrects the clock deviation from the master device 2, which also reduces the clock deviation between the slave devices 1 and enables highly accurate time synchronization between the slave devices 1.

According to the time synchronization program, the slave devices 1, and the time synchronization method described above, it is possible to produce the following effects, for example.

In the calibration process, the calibration processing unit 115 calculates the clock deviation between the master device 2 and the slave device 1 based on multiple pieces of time information in each of the master device 2 and the slave device 1. In the time synchronization process, the clock deviation corrector 112 corrects the clock deviation by dividing the difference in the clock deviation and reflecting each of the divided differences into the time information in the slave device 1.

This enables the highly accurate time synchronization between the devices.

For example, correcting the clock deviation, which is one of the factors for accuracy deterioration of time synchronization, enables even a general-purpose PCIe card to achieve time synchronization with an accuracy of 1 µs or less. This also enables the time synchronization between general-purpose devices to achieve a time synchronization accuracy comparable to that of the time synchronization between devices equipped with highly accurate oscillators.

Such highly accurate time synchronization makes the information processing system 100 applicable to a fair and equitable trading system.

Since a general-purpose server is enabled to perform highly accurate time synchronization, it is possible to achieve highly accurate time synchronization without developing a dedicated device.

The calibration processing unit 115 calculates the transmission path delay between the master device 2 and the slave device 1 prior to the start of the time synchronization process. When a variation in the calculated clock deviation or transmission path delay is detected in the time synchronization process, the calibration processing unit 115 again calculates at least one of the clock deviation and the transmission path delay.

This enables the time synchronization to be continuously executed even when the clock deviation or the transmission path delay occurs due to a cause such as aging deterioration.

In the time synchronization process, the offset corrector 113 dividedly corrects the time offset between the master device 2 and the slave device 1.

This leads to a gentle change in the time information by the correction in the slave device 1 and reduces a time difference between multiple slave devices 1.

[B] Modified Example

Figure 31:
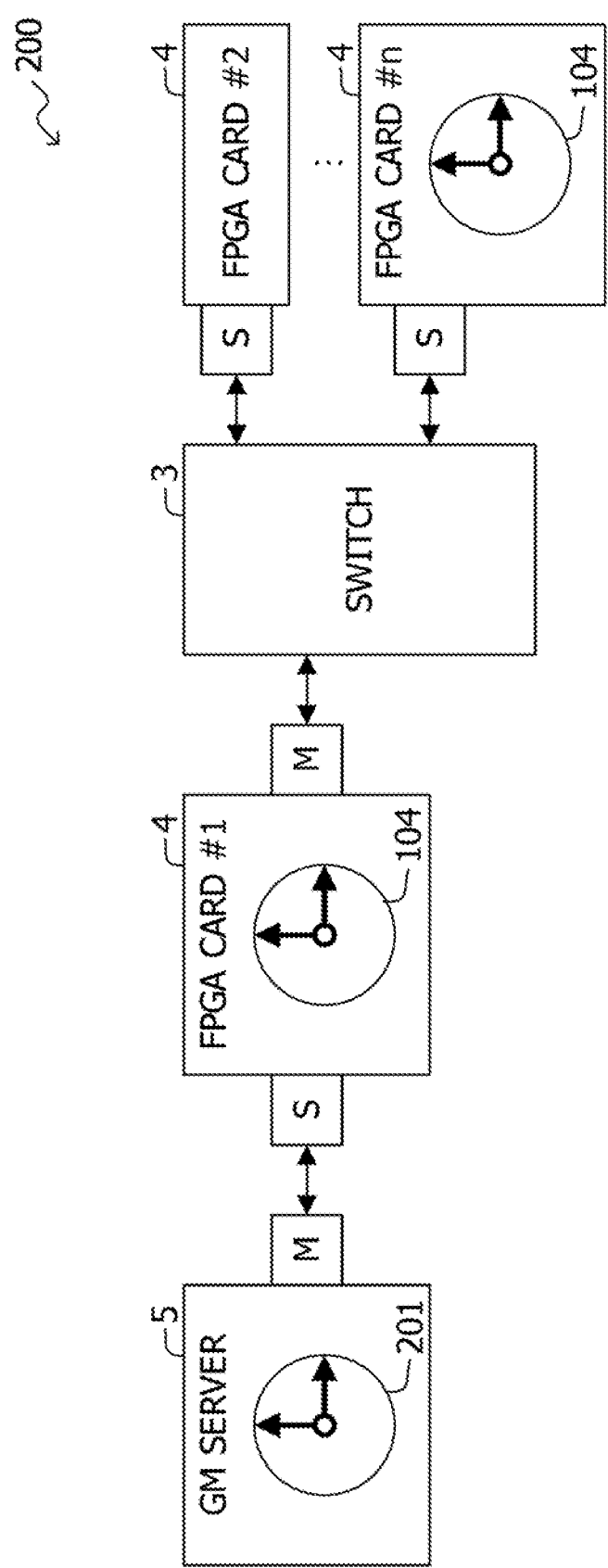
FIG. 31 is a block diagram schematically illustrating a configuration example of an information processing system in a modified example.

FIG. 31 is a block diagram schematically illustrating a configuration example of an information processing system 200 in a modified example.

The device configuration of the information processing system is not limited to the example illustrated in FIG. 1.

As illustrated in FIG. 31, it is possible to achieve highly accurate time synchronization among general-purpose devices. The information processing system 200 includes a switch 3, n field-programmable gate array (FPGA) cards 4 (FPGA cards #1 to #n), and a grand master (GM) server 5.

The GM server 5 has the functions same as or similar to those in the master device 2 illustrated in FIG. 1, while the FPGA cards 4 have the functions same as or similar to those in the slave devices 1 illustrated in FIG. 1.

The GM server 5 and The FPGA card #1 are directly coupled to each other, and the FPGA card #1 is coupled to the FPGA cards #2 to #n through the switch 3.

For example, the FPGA card 4 which increases timings for time synchronization in the time synchronization process is arranged between the GM server 5 and the FPGA cards 4 on the slave side. For instance, a process of increasing the timings for time synchronization in the time synchronization process is executed based on the FPGA card 4 arranged between the GM server and the FPGA cards 4 on the slave side.

Since the FPGA is capable of high-speed processing, the FPGA card #1 on the GM server 5 side is capable of issuing sync/FollowUp to each of the FPGA cards #2 to #n on the slave side at high frequency (for example, 1000 times/second).

According to the information processing system 200 in the modified example illustrated in FIG. 31, it is possible to produce not only the effects producible by the aforementioned example of the embodiment, but also the following effects.

The FPGA cards #2 to #n on the slave side are enabled to perform time correction at high frequency with respect to the FPGA card #1 on the GM server 5 side, so that the GM server 5 side and the slave side achieve highly accurate time synchronization. It is possible to achieve highly accurate time synchronization between the FPGA cards #2 to #n on the slave side.

[C] Others

The technique disclosed herein is not limited to the foregoing embodiment and may be variously modified and changed without departing from the gist of the embodiment. Any one or any combination of two or more of the configurations and the processes described in the embodiment may be selected as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a time synchronization process between a master device and a slave device, the process comprising:
   calculating a clock deviation between the master device and the slave device based on a plurality of pieces of time information in each of the master device and the slave device and an increment ratio of time increments;
   calculating a transmission path delay between the master device and the slave device;
   dividing a difference in the clock deviation for each time increment including the plurality of pieces of time information;
   incorporating each of divided differences into the time information of the slave device to correct the clock deviation within the time increment; and
   when a variation in the calculated clock deviation or the transmission path delay is detected, calculating at least one of the clock deviation and the transmission path delay again.

2. The non-transitory computer-readable recording medium according to claim 1, the process further comprising:
   performing the time synchronization process based on the time information of the slave device corrected for the clock deviation.

3. The non-transitory computer-readable recording medium according to claim 1, wherein the incorporating corrects timing of the slave device to correct for the clock deviation a number of times within the time increment.

4. The non-transitory computer-readable recording medium according to claim 1, the process further comprising:
   measuring a difference in the clock deviation between the master device and the slave device to calculate a time offset; and
   dividedly correcting the time offset between the master device and the slave device.

5. The non-transitory computer-readable recording medium according to claim 1, the process further comprising:
   increasing a frequency with which the time synchronization process is performed based on a circuit arranged between the master device and the slave device.

6. An information processing apparatus coupled to a master device, the information processing apparatus comprising:
   a memory; and
   a processor coupled to the memory and the processor configured to:
   calculate a clock deviation between the master device and the information processing apparatus based on a plurality of pieces of time information in each of the master device and the information processing apparatus and an increment ratio of time increments;
   calculate a transmission path delay between the master device and the information processing apparatus;
   divide a difference in the clock deviation for each time increment including the plurality of pieces of time information;
   incorporate each of divided differences into the time information of the information processing apparatus to correct the clock deviation within the time increment; and
   when a variation in the calculated clock deviation or the transmission path delay is detected, calculating at least one of the clock deviation and the transmission path delay again.

7. The information processing apparatus according to claim 6, wherein the processor performs the time synchronization process based on the time information of the information processing apparatus corrected for the clock deviation.

8. The information processing apparatus according to claim 6, wherein the processor corrects timing of the information processing apparatus to correct for the clock deviation a number of times within the time increment.

9. The information processing apparatus according to claim 6,
   wherein the process is further configured to:
   measure a difference in the clock deviation between the master device and the information processing apparatus to calculate a time offset; and
   dividedly correct a time offset between the master device and the information processing apparatus.

10. The information processing apparatus according to claim 6,
    wherein the process is further configured to:
    increase a frequency with which the time synchronization process is performed based on a circuit arranged between the master device and the information processing apparatus.

11. A time synchronization method of a slave device coupled to a master device, the time synchronization method comprising:
    calculating a clock deviation between the master device and the slave device based on a plurality of pieces of time information in each of the master device and the slave device and an increment ratio of time increments;
    calculating a transmission path delay between the master device and the slave device;
    dividing a difference in the clock deviation for each time increment including the plurality of pieces of time information;
    incorporating each of divided differences into the time information of the slave device to correct the clock deviation, by a processor within the time increment; and
    when a variation in the calculated clock deviation or the transmission path delay is detected, calculating at least one of the clock deviation and the transmission path delay again.

12. The time synchronization method according to claim 11, further comprising:
    performing the time synchronization process based on the time information of the slave device corrected for the clock deviation.

13. The time synchronization method according to claim 11, wherein
    the incorporating corrects timing of the slave device to correct for the clock deviation a number of times within the time increment.

14. The time synchronization method according to claim 11, the time synchronization method further comprising:
    measuring a difference in the clock deviation between the master device and the slave device to calculate a time offset; and
    dividedly correcting a time offset between the master device and the slave device, by the processor.

15. The time synchronization method according to claim 11, the time synchronization method further comprising:
    increasing a frequency with which the time synchronization process is performed based on a circuit arranged between the master device and the slave device, by the processor.

16. The time synchronization method according to claim 11, wherein a second slave device performs the time synchronization method with the master device and each of the first slave device and the second slave device perform the time synchronization method in response to receiving a Follow-up Precision Time Protocol Signal (PTP) from the master device.

* * * * *